April 16, 1968    D. S. REYNOLDS ET AL    3,378,170
MIXED BEVERAGE REFRIGERATING AND DISPENSING MACHINE
Filed March 31, 1966    9 Sheets-Sheet 1
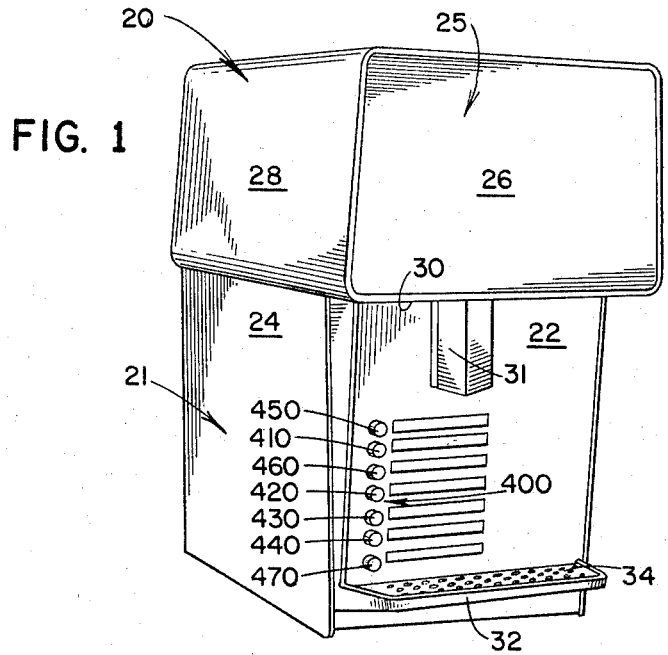
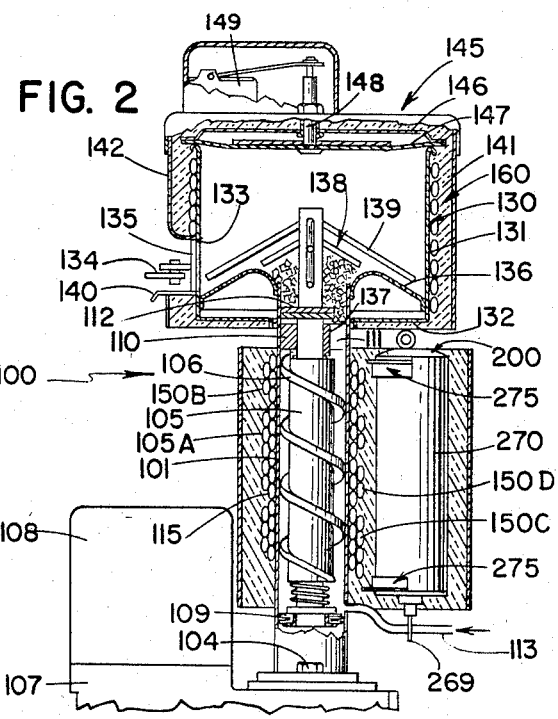
Inventors
DONALD S. REYNOLDS
HARVEY R. KRUEGER
BY
Prangley, Baird, Clayton, Miller & Vogel.
ATTYS.

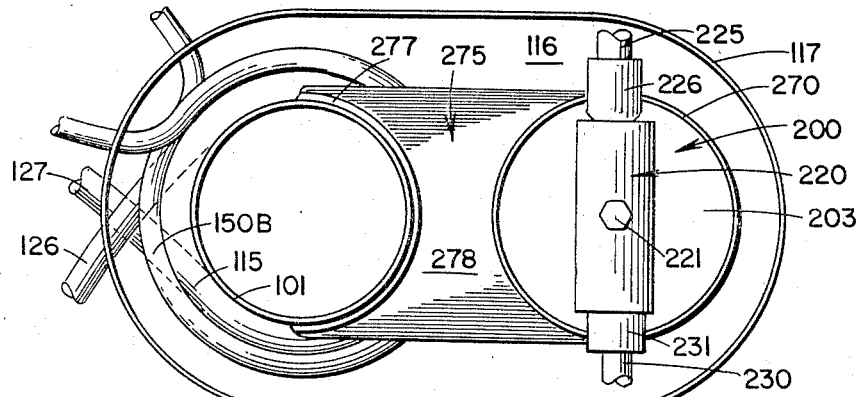
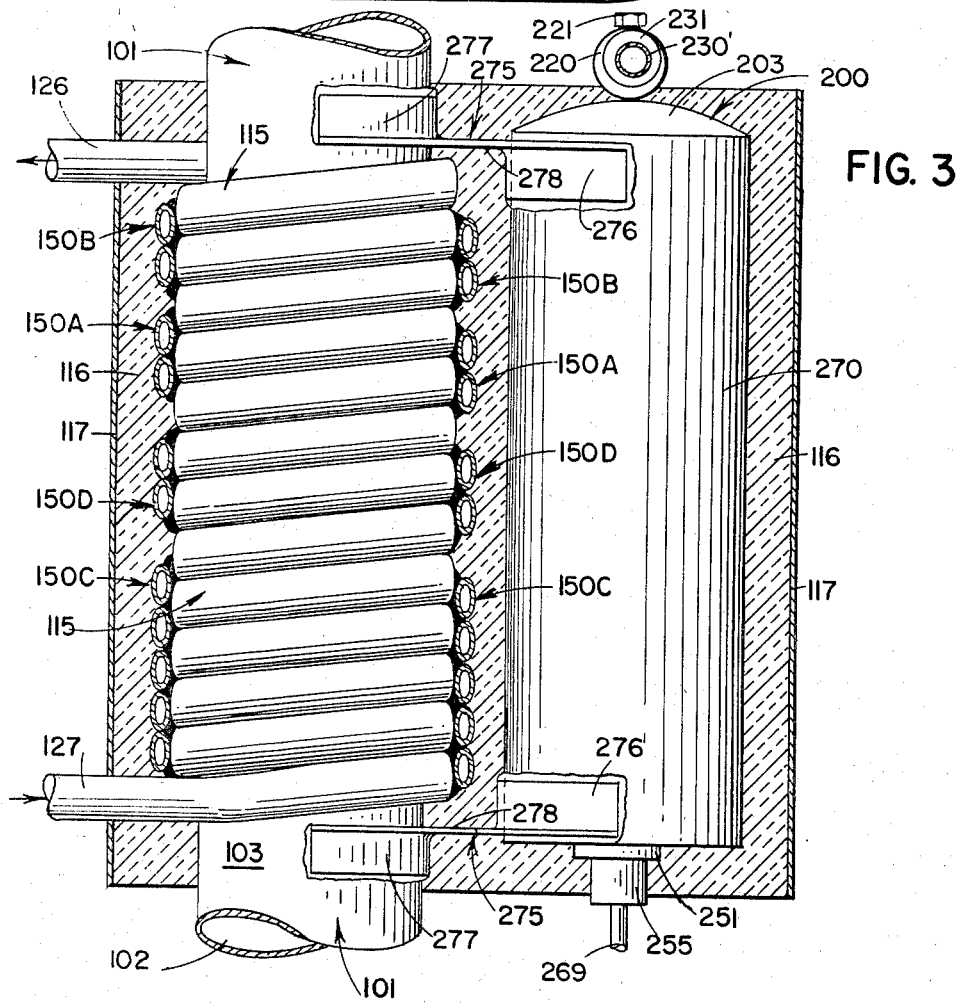

April 16, 1968     D. S. REYNOLDS ET AL     3,378,170

MIXED BEVERAGE REFRIGERATING AND DISPENSING MACHINE

Filed March 31, 1966     9 Sheets-Sheet 4

April 16, 1968 D. S. REYNOLDS ETAL 3,378,170
MIXED BEVERAGE REFRIGERATING AND DISPENSING MACHINE
Filed March 31, 1966 9 Sheets-Sheet 7

April 16, 1968 D. S. REYNOLDS ET AL 3,378,170
MIXED BEVERAGE REFRIGERATING AND DISPENSING MACHINE
Filed March 31, 1966 9 Sheets-Sheet 9

United States Patent Office 3,378,170
Patented Apr. 16, 1968

3,378,170
MIXED BEVERAGE REFRIGERATING AND
DISPENSING MACHINE
Donald S. Reynolds, Glencoe, and Harvey R. Krueger,
Carpentersville, Ill., assignors to Reynolds Products,
Inc., Rolling Meadows, Ill., a corporation of Illinois
Filed Mar. 31, 1966, Ser. No. 541,465
39 Claims. (Cl. 222—129.4)

This invention relates to beverage dispensing machines, and particularly to automatic manual and coin operated beverage dispensing machines, and to improved components and control mechanisms therefor.

Although the iced beverage dispensing machine of the present invention has general utility, the manually actuated form thereof is particularly useful in cafeterias, restaurants, hospitals, soda fountains, drive-in restaurants, and the like, wherein drinks are to be dispensed quickly in response to a demand therefor. It is highly desirable that the same machine be able to dispense a wide variety of character of drinks, for example, a plurality of different flavors of drinks, drinks either with or without ice therein, and drinks formulated either with still (non-carbonated) water or carbonated water, as the customer requires. In the interest of economy, and in order to please the customers, it further is desirable that each drink have the same volume regardless of the character and composition thereof. It further is desirable in the case of carbonated drinks that the ice therein be in the form of ice cubes having a minimum surface area and a minimum number of sharp edges so as not to cause an increase in the loss of the carbon dioxide gas from the drink, such loss resulting in a "flat" drink; it likewise is desirable that the ice cubes have a minimum surface area in relation to the volume thereof so as to prolong the life of the ice cubes in the drink.

It further is desirable that the iced beverage dispensing machine be contained within relatively small physical confines so that it can be mounted upon a counter, shelf, or the like. Prior beverage dispensing machines which will fit upon counters and shelves in cafeterias, restaurants, soda fountains, drive-in restaurants, and the like, have not produced the quality of ice and the quantity of drink desired, and those prior beverage dispensing machines that can produce ice cubes and drinks of the character and quality desired have not been sufficiently small to be placed upon a counter or shelf during the operation thereof and in ready access to a user.

Finally, the beverage dispensing machine must be capable of producing a steady and substantial volume of ice cubes and carbonated water, all without undue size in the equipment, without excessive noise in operation and without undue wear upon the operating parts of the machine. It also is highly desirable that the machine be adapted for coin operation therefor if desired.

Accordingly, it is an important object of the present invention to provide an improved beverage dispensing machine, and particularly an improved beverage dispensing machine that can produce a large variety of drinks including iced drinks and carbonated drinks when desired.

Another object of the invention is to provide a beverage dispensing machine of the type set forth which has small overall dimensions in relation to the capacity for producing drinks therefrom, which machine can produce substantially continuously and at a high rate ice cubes possessing the desired characteristics and carbonated water possessing the desired characteristics.

In connection with the foregoing object, it is a specific object of the invention to provide a beverage dispensing machine of the character noted that can readily fit upon counters and shelves in cafeterias, restaurants, soda fountains, drive-in restaurants, and the like, now in common use.

Still another object of the invention is to provide in an iced beverage dispensing machine of the character noted an ice making apparatus including a freezing chamber defined by a tube, a cooling conduit being provided on the tube and in thermal contact therewith for cooling flavor syrup, the refrigeration system for the ice making apparatus serving therefore to cool the flavor syrup utilized in the machine.

Yet another object of the invention is to provide an iced beverage dispensing machine of the type set forth wherein the ice from the ice making apparatus is delivered to a storage hopper, and the storage hopper has in thermal contact therewith a cooling conduit for receiving therethrough water and the like, whereby a portion of the ice in the storage hopper is utilized to cool the water incorporated into the drinks dispensed by the machine.

Still another object of the invention is to provide in an iced beverage dispensing machine of the type set forth an improved carbonator, the carbonator being maintained in a cool condition by being placed in thermal contact with the ice making apparatus and particularly with the freezing tube forming a part thereof.

Yet another object of the invention is to provide an improved carbonator and carbonating system wherein a predetermined charge of water is forcefully injected into a carbonating atmosphere, the water being broken up into droplets to obtain maximum exposure to the carbonating atmosphere and thereafter immediately discharged to a dispensing station, whereby there is provided substantially instantaneous carbonation.

In connection with the foregoing object, it is another object of the invention to provide in a carbonator of the type set forth an improved baffle for directing the entering stream of water into droplets and an improved float actuated outlet valve that is especially designed for rapid and uniform operation.

A further object of the invention is to provide an improved water pump as a part of the carbonating system so as to obtain steady flow of water through the carbonator and to the dispensing station of the associated beverage dispensing machine, and a bypass valve associated with the water pump so that when a beverage containing ice is to be dispensed, a quantity of water equivalent to the volume of ice to be added is diverted from the output of the pump so that drinks containing ice cubes and drinks not containing ice cubes have the same volume.

Still another object of the invention is to provide in an iced beverage dispensing machine of the type set forth a stirrer in the ice storage hopper and control mechanism for the stirrer to cause operation thereof every time that a drink is dispensed by the machine, even though no ice is to be placed in the dispensed drink.

A further object of the invention is to provide improved control mechanisms for beverage dispensing machines of the type set forth, including both manually actuated control mechanisms and coin actuated control mechanisms therefor.

Further features of the invention pertain to the particular arrangement of the parts of the beverage dispensing machine and to the particular control mechanisms and control circuits utilized in connection therewith, whereby the above outlined and additional operating features are attained.

The invention, both as to its organization and method of operation together with further objects and advantages thereof, will best be understood by reference to the following specification when taken with the accompanying drawings, in which:

FIGURE 1 is a perspective view of the front of the improved beverage dispensing machine of the present invention;

FIG. 2 is a view in vertical section through the ice making apparatus forming a part of the machine of FIG. 1 and also showing the association therewith of the carbonator, all forming a part of the present invention;

FIG. 3 is an enlarged view showing the construction of the tube forming a part of the ice making apparatus and defining the freezing chamber thereof, and also illustrating the mounting of the various refrigerant and syrup coils thereon and the carbonator associated therewith;

FIG. 4 is a top view of the assembly of FIG. 3, the auger having been removed from the ice cube making apparatus for the purpose of simplifying the illustration;

Figure 5:
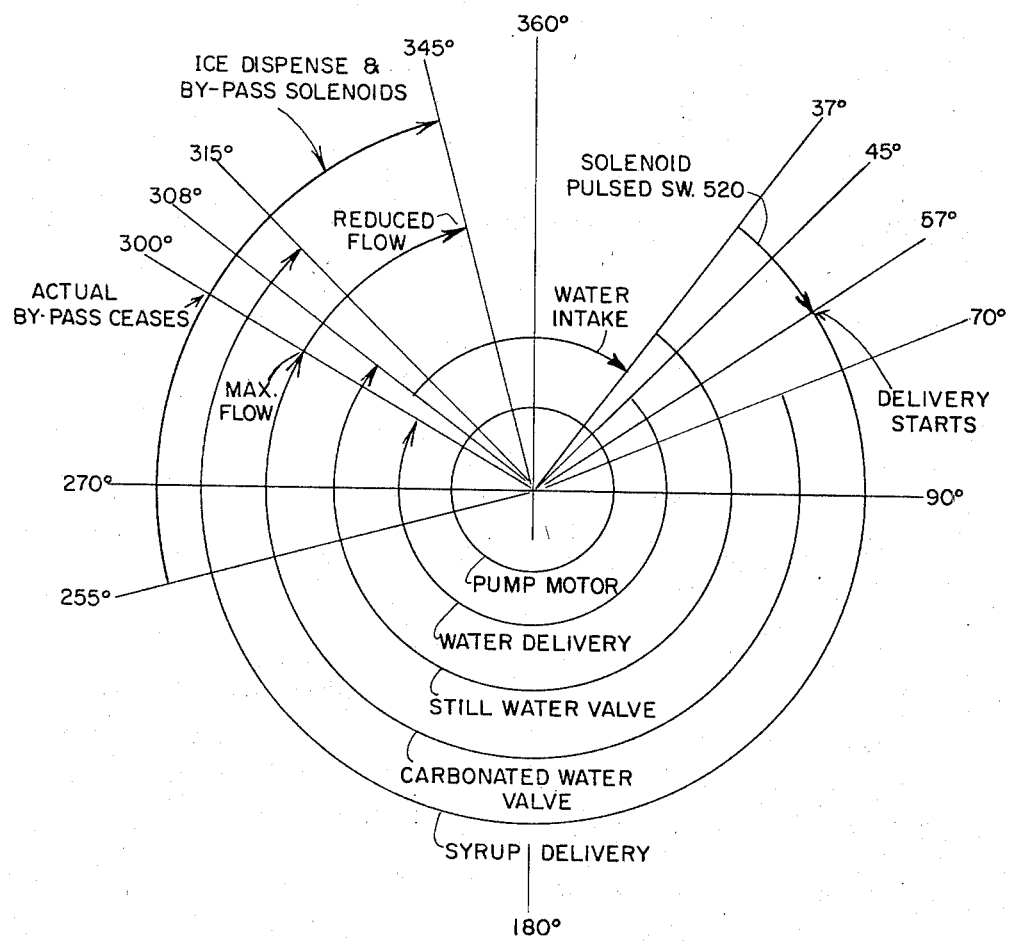
FIG. 5 is a diagram illustrating a typical cycle of operation of the machine of FIGS. 1 and 2.

Referring to FIG. 1 of the drawings, there is shown a perspective view of a beverage dispensing machine 20 made in accordance with and embodying the principles of the present invention. The machine 20 includes a lower housing 21 within which are disposed the ice making apparatus and the pumping apparatus, the lower housing 21 including a front wall 22, a pair of side walls 24 and a rear wall (not shown). Disposed above the lower housing 21 is an upper housing 25 including a front wall 26, a pair of side walls 28, a forwardly extending and overhanging bottom wall 30 and a rear wall (not shown). Extending downwardly from the bottom wall 30 and mounted on the front wall 22 is a fixture 31 defining a dispensing station against which may be placed a receptacle such as a paper cup 35 to receive the beverage to be dispensed, discharge openings (not shown) being provided immediately thereabove for still water, carbonated water, four different flavor syrups and ice cubes. Disposed to the left and extending through the front wall 22 are the control buttons for operating the control mechanism, the assembly of buttons generally being designated by the numeral 400. Also mounted upon the front wall 22 is a drain tray 32 having a perforated screen 34 thereon communicating with a collecting area therebelow (not shown) provided with the drain connection (not shown) for discharge into any receptacle or drain for water and melt-down from ice upon the drain tray 32.

Disposed within the housings 21 and 25 is an ice cube making apparatus generally designated by the numeral 100, the construction and operation of the ice making apparatus 100 being best illustrated in FIGS. 2 to 4 and 11 of the drawings. A fundamental part of the ice making apparatus 100 is a vertically arranged tube 101 having an inner wall 102 defining a generally cylindrical upstanding freezing chamber and an outer wall 103, the lower end of the tube 101 being fixedly secured to an immovable part of the machine 20 by means of bolts 104. Disposed within the tube 101 and extending vertically therein is an auger 105 carrying thereon a spiral blade 106 extending from the lower end to the upper end thereof, the lower end of the auger 105 being connected to a gear reducer mechanism 107 driven by a motor 108 to cause rotation of the auger 105 within the tube 101. The lower end of the auger 105 has a water tight seal 109 disposed thereabout to seal the lower end of the tube 101 and the upper end of the auger 105 is received and supported in an extruding head 110, the extruding head 110 being fixedly secured within the tube 101 and having a plurality of ice compressing and ice shaping passages 111 therethrough. Disposed above and also carried by the auger 105 is an ice blocking member 112 which serves periodically and sequentially to block the ice passages 111 during the operation of the ice making apparatus 100. In order to make ice, water is admitted into the lower end of the tube 101 from a conduit 113, the water rising in the tube 101 and being frozen against the inner wall 102 thereof due to the cooling of the tube 101 by means of a refrigerant coil 115, the refrigerant coil 115 being tightly wrapped about the tube 101 and supported thereby and in good thermal contact therewith and being connected to a refrigerating system, the details of which will be described further hereinafter with respect to FIG. 13. Disposed about and surrounding the tube 101 and the parts thereon is a quantity of heat insulating material 116 such as urethane foam insulation, the insulation 116 being held in position by means of a jacket 117.

Figure 13:
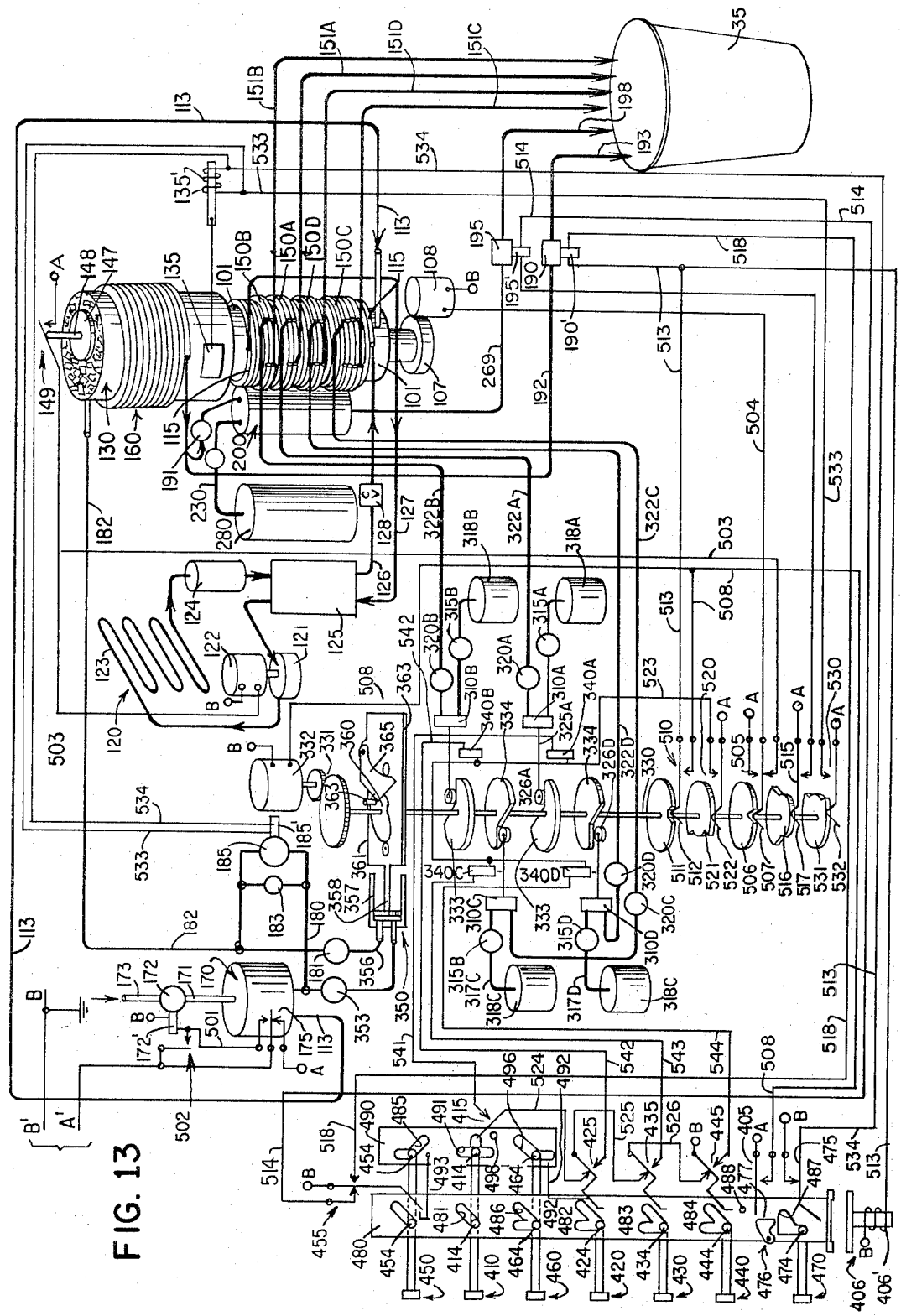
FIG. 13 is a schematic and diagrammatic view of a combined electrical, hydraulic and pneumatic circuit for the machine of FIG. 1.

Referring to FIG. 13 it will be seen that the refrigerant coil 115 is connected in circuit with a refrigeration system generally designated by the numeral 120 and including the usual compressor 121, a drive motor 122 therefor, a condenser 123, a dryer 124, and an accumulator 125 from which liquid refrigerant is fed along the line 126 via an expansion valve 128 to the input to the refrigerant coil 115 at the lower end thereof, and the upper end of the refrigerant coil 115 being connected by a line 127 through the accumulator from whence the gaseous refrigerant is fed back to the compressor 121, all in a conventional manner.

In the operation of the ice cube making apparatus 100, water from the conduit 113 is frozen upon the inner wall 102 of the tube 101 due to the refrigeration thereof by means of the refrigerant coil 115; the film of water on the inner wall 102 is scraped therefrom by the blade 106 on the auger 105 and is fed upwardly and compressed and congealed in passing through the ice passages 111 in the extruding head 110, the ice blocking member 112 aiding in this regard to insure that the ice is fully compact and solidified, after which the member 112 breaks the compact rod of the ice thus generated into individual hard and compact ice cubes. It is to be understood that when the term "cube" is used throughout this specification that a unitary mass or block of ice is meant. The term is not to be construed in its geometric sense and is merely used as a convenient nomenclature to distinguish the compact unitary ice mass produced by the apparatus 100 from the flaked ice or small pieces of ice of the prior art.

The ice cubes so produced are fed upwardly into a storage hopper 130 that is mounted above and generally concentric with the vertical axis of the auger 105. The hopper 130 includes an upstanding cylindrical side wall 131 having a diameter substantially greater than the diameter of the tube 101 and arranged substantially concentric therewith, the lower end of the side wall 131 joining an inwardly and slightly downwardly directed bottom wall 132 which slopes down and inwardly to the outer wall 103 of the tube 101 and is securely joined thereto in a water tight manner. Provided in the side wall 131 is an opening 133 normally closed by a door 135, the position of the door 135 being controlled by a linkage 134 and a solenoid to be described more fully hereinafter. In order to maintain the ice stored within the hopper 130 in a substantially dry condition, a foraminous support wall 136 is provided adjacent to the bottom thereof, the support wall 136 sloping upwardly toward the center and being joined on the outer edge thereof to the inner surface of the side wall 131 and being joined on the inner edge thereof to the upper end of the tube 101, whereby any meltdown of ice stored upon the support wall 136 drops therethrough and falls upon the bottom wall 132 and is fed back to the interior of the tube 101 for refreezing via a series of openings 137 therein. Also disposed in the hopper 130 and immediately above the support wall 136 is a stirrer 138 including a plurality of arms 139, the stirrer 138 being operatively connected to the auger 105 for movement therewith. The stirrer 138 tends to stop the coalescing of the ice cubes within the storage hopper 139 during the melting thereof and also serves to push ice cubes outwardly through the opening 133 when the door 135 is in the open position, the ice cubes falling upon a delivery chute 140 that feeds the ice cubes to the dispensing station adjacent to the fixture 31.

There also is provided about the hopper 130 a suitable quantity of insulating material 141, the insulating material 141 being held in position by an outer casing 142. Closing the upper end of the storage hopper 130 is a cover 145 that includes a top wall 146 formed of plastic and overlying and pressing against the upper edge of the side wall 131 a flexible sealing diaphragm 147. The diaphragm 147 also carries thereon a plunger 148 for actuating a level control switch 149 mounted on the cover 145 and forming a part of the control circuit, all as will be described more fully hereinafter; suffice it to say that when the hopper 130 becomes full of ice cubes so that the diaphragm 147 and the plunger 148 are lifted upwardly, the switch 149 is actuated to stop production of additional ice cubes.

A further detailed description of the construction and operation of the above described ice cube making apparatus 100 including the construction and operation of the extruding head 110, the refrigerating system 120, the storage hopper 130 and the cover 145 can be had by reference to United States Letters Patent No. 3,196,682 granted July 17, 1965 to Donald S. Reynolds for Ice Making and Dispensing Machine, the apparatus 100 hereof being substantially identical with the construction disclosed and claimed therein.

In accordance with the present invention, an important feature resides in the fact that the refrigeration coils for the flavor syrups utilized in the machine 20 are cooled by the same refrigerating system 120 that freezes the water for the ice cube making apparatus 100. More specifically, in the machine 20 four syrup cooling coils are provided for a corresponding number of different flavor syrups, it being desirable substantially to cool the syrups before insertion thereof into the drink being formulated at the dispensing station 31. To this end four syrup cooling coils 150A, 150B, 150C, and 150D have been provided about the refrigerant coil 115 and secured thereto and placed in good thermal contact therewith, see FIGS. 2 to 4 of the drawings. As is best seen in FIG. 3, each of the syrup coils 150A, 150B, and 150D comprise essentially two turns about the refrigerant coil 115, whereas the syrup coil 150C disposed at the bottom of the refrigerant coil 115 comprises five turns, this being necessary since the refrigeration load on the refrigerant coil 115 is the greatest at the bottom thereof since the relatively warm water to be frozen is admitted from the conduit 113 adjacent to the bottom of the refrigerant coil 115. Accordingly, it is necessary to provide a substantially greater number of turns in the syrup cooling coil 150C in order to obtain satisfactory cooling of the syrup therein, and more specifically to obtain a cooling of the syrup therein comparable to that obtained in the other syrup cooling coils 150A, 150B and 150D. This structure serves to cool the syrup within the coils to a temperature below 20° F., the preferred operating temperature being about 15° F.

Another important feature of the present invention resides in the provision of a water cooling coil 160 about the storage hopper 130, and specifically the vertical side wall 131, the water cooling coil 160 being wrapped around and supported by and in good thermal contact with the wall 131. As a consequence, the ice cubes within the hopper 130 in cooling the side wall 131 also cool the coil 160 and the water therein, whereby the cooling load for cooling the water in the coils 160 is also imposed upon the refrigerating system 120. As a consequence, it will be seen that the same refrigerating system 120 is used to produce the ice cubes in the ice cube making apparatus 100, to cool the flavor syrup in the flavor coils 150A, 150B, 150C and 150D, and finally to cool the water in the coil 160, the water in the coil 160 being used to supply both the carbonator 200 and to provide still or non-carbonated water to the dispensing station 31 and thence into the cup 35. The water in the coil 160 is cooled to a temperature preferably below 40° F. and down to and toward the freezing point of 32° F.

Figure 6:
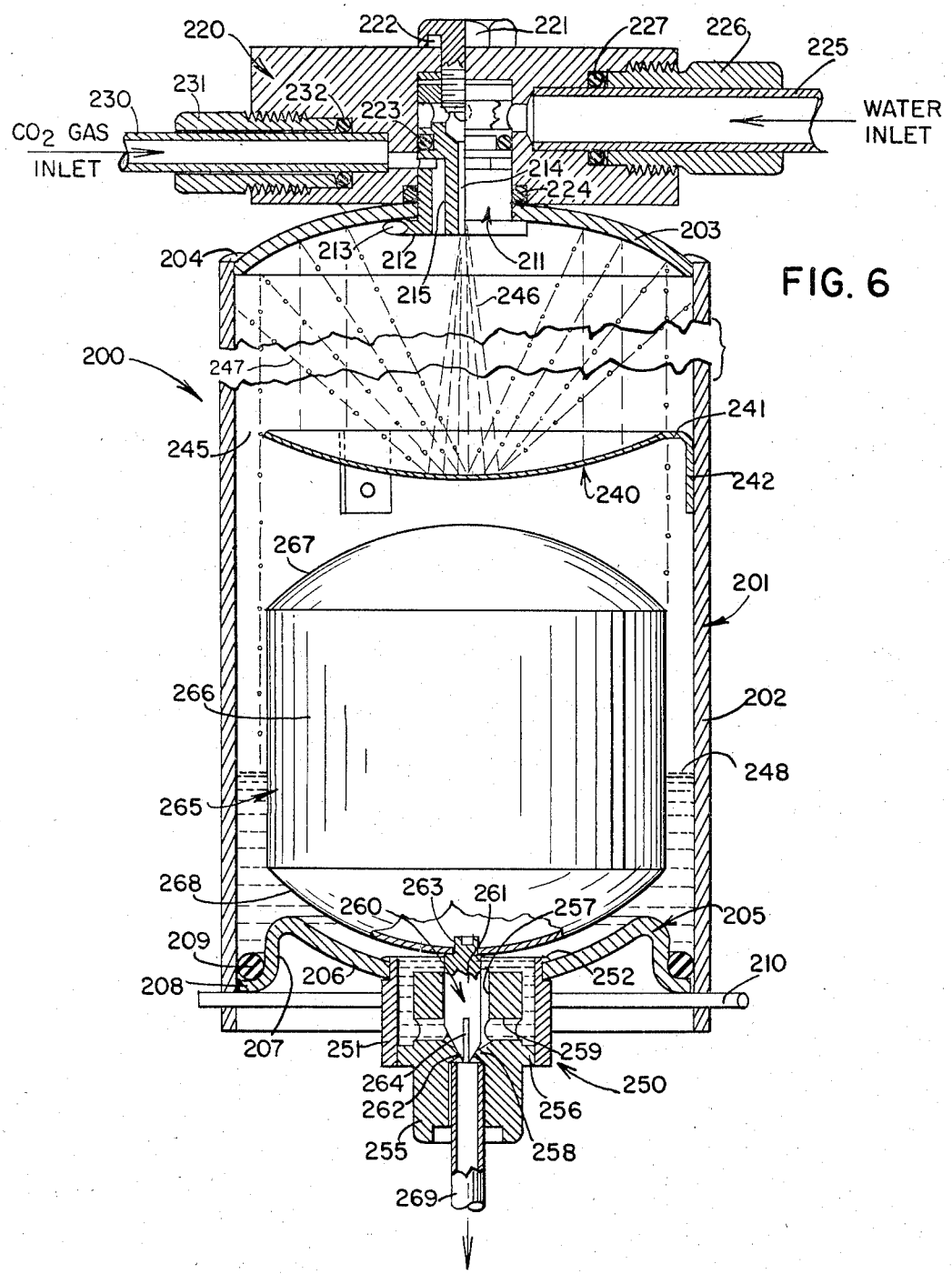
FIG. 6 is an enlarged view in vertical section with certain portions broken away through the carbonator forming a part of the present invention.

The construction and operation of the carbonator 200 will now be described with special reference to FIGS. 3, 4 and 6 of the drawings. The carbonator 200 comprises a fluid-tight vessel 201 including a cylindrical side wall 202 that is closed at the upper end thereof by an outwardly dished top wall 203 secured to the upper end of the side wall 202 as by welding at 204. The lower end of the side wall 203 is closed by a bottom wall 205 that is free to move upwardly and downwardly within the side wall 202 and includes a central outwardly domed or dished portion 206 having around the periphery thereof a downwardly directed flange 207 which in turn carries an outwardly directed flange 208. Disposed upon the flange 208 and extending around the flange 207 and bearing against the inner surface of the side wall 202 is a sealing O-ring 209 that serves to seal the space between the wall 202 and the bottom wall 205. An outward limit to the movement of the bottom wall 205 is provided by a pair of pins 210 extending through openings in the side wall 202 and engaging beneath the bottom flange 208.

In order to admit carbonating gas and water into the vessel 201, a fitting 211 is provided centrally of the top wall 203 and extending through an opening therein, the lower end of the fitting 211 having an outwardly directed flange 212 disposed beneath the top wall 203 and secured thereto as by brazing at 213. The upper end of the fitting 211 has a first passage 214 therein communicating with the interior of the vessel 201 and to the exterior of the fitting 211 and adapted to carry water. A second passage 215 is provided in the fitting 211 and communicating with the interior of the vessel 201 and with the exterior of the fitting 211 to carry carbonating gas into the vessel 201. Cooperating with the fitting 211 is a block 220 which has an opening vertically therein to receive the fitting 211 and has an opening at the upper end thereof receiving therethrough a bolt 221 engaging a threaded opening at the upper end of the fitting 211 to urge the parts into the assembled position, a sealing O-ring 222 being provided between the underside of the bolt 221 and the upper surface of the block 220, another O-ring 223 being provided in a groove about the fitting 211 and engaging the opening in the block 220, and a third O-ring 224 being disposed in a groove in the lower surface of the block 220 and bearing against the periphery of the fitting 211 and against the top wall 203 to form seals mutually therebetween. There is received in the right hand end of the block 220 a water inlet pipe 225 which has thereon a coupling 226 and a cooperating O-ring 227, the pipe 225 communicating with the passage 214 to admit water from the supply pipe 225 into the interior of the vessel 201. The lefthand end of the block 220 has extending thereinto a gas inlet pipe 230 which has thereon a coupling 231 and a cooperating O-ring 232 to mount the pipe 230 thereon, the interior of the pipe 230 communicating with the passage 215 to admit carbonating gas, for example carbon dioxide, into the interior of the vessel 201.

Mounted within the vessel 201 substantially centrally thereof is a baffle 240 that is generally circular in shape and has three rearwardly and outwardly extending arms 241 carrying downturned mounting flanges 242 thereon that are suitably secured as by welding to the side wall 202. The periphery of the baffle 240 accordingly is spaced from the inner surface of the side wall 202 around the greater portion of the circumference thereof to provide therebetween a passage 245. As viewed from the water inlet passage 214, the baffle 240 is shaped concave and further is formed and arranged so that a spray of water diagrammatically indicated at 246 entering from the passage 214 is directed upon the concave upper surface of the baffle 240 and upon striking the baffle 240 is broken up into individual droplets diagrammatically illustrated as at 247, which droplets 247 are directed generally upwardly and outwardly toward the top wall 203 and the side wall 202, the water finally falling in a thin film through the passage 245 and downwardly to the lower end of the vessel 201. It will be understood that during the operation of the carbonator 200, there will be an atmosphere of carbon dioxide gas under pressure within the vessel 201 above the accumulated water at the bottom thereof and that the breaking up of the entering water into droplets by violent impingement upon the baffle 240 and the subsequent falling of the water as a thin film through the passage 245 serves to give maximum exposure of the water to the carbonating atmosphere, thus to obtain rapid, complete, thorough and uniform carbonation of the water within the vessel 201. As a consequence there is substantially instantaneous carbonation of the water within the vessel 201, the water becoming fully carbonated very quickly and essentially instantaneously due to the substantial exposure thereof to the carbon dioxide atmosphere within the vessel 201.

The carbonated water collected as at 248 at the bottom of the vessel 201 is fed therefrom through an outlet valve generally designated by the numeral 250. The outlet valve 250 includes a cylindrical casing 251 which extends upwardly into an opening in the bottom wall 205 and is secured thereto such as the peening over as at 252. Disposed within the casing 251 is a valve body 255 that is also generally cylindrical in shape and has an outwardly extending peripheral flange 256 extending therearound and having an outer diameter fitting within the lower end of the casing 251, the flange 256 and the casing 251 being suitably secured to each other as by welding. Formed in the valve body 255 is a vertical cylindrical opening 257 providing a vertical passage therethrough, a valve seat 258 being provided intermediate the ends of the vertical passage 257 and having a smaller diameter to cooperate with a closer member as will be described more fully hereinafter. Extending radially outwardly from the vertical passage 257 above the valve seat 258 is a plurality of horizontal passages 259, four of the horizontal passages 259 having been provided for purposes of illustration.

In order to cooperate with the valve seat 258 in the outlet valve 250 there has been provided a closure member 260 which has a body 261 that is essentially triangular in cross section and is shaped and arranged to fit closely within that portion of the vertical passage 257 disposed above the valve seat 258, the body 261 terminating at the lower end in a conical surface 262 which seats upon the valve seat 258 substantially to seal the opening through the valve seat 258. The upper end of the body 261 has a reduced portion 263 which extends upwardly into an opening in the lower end of a hollow cylindrical float 265, the float 265 having a generally cylindrical section 266 which is disposed vertically and has a diameter slightly less than the internal diameter of the side wall 202, whereby to form in essence a continuation of the vertical passage 245, the ends of the cylindrical section 266 being closed by an upper domed section 267 and a lower domed section 268. It will be understood that the float 265 is formed fluid tight and is constructed so that it will float upon the carbonated water collected as at 248 when a suitable amount of the carbonated water is collected therein. There is provided in one side of the body 261 a vertically arranged slot 264 which permits carbonated water to bleed through the outlet valve 250 even when the closure member 260 is in the seated position upon the valve seat 258. Finally, there is provided in the lower portion of the vertical passage 257, i.e., below the valve seat 258, a connection to an outlet pipe 269.

In a typical construction of the carbonator 200, the side wall 202, the top wall 203, the bottom wall 205, the baffle 240, the valve casing 251, and the valve body 255 are all formed of stainless steel. The fitting 220 is formed of a durable synthetic organic plastic resin, the preferred resin being an acetal resin sold under the trademark "Delrin," and the outlet pipe 269 is also preferably formed of plastic. The stainless steel construction of the above-named parts renders operation thereof sanitary, it further being pointed out that the provision of the pins 210 to hold the bottom wall 205 in place permits the bottom wall 205 and the parts mounted thereon to be removed quickly for ready cleaning of the interior of the carbonator 200. During the operation of the carbonator 200, the carbon dioxide gas is maintained at a pressure of approximately 70 p.s.i. within the vessel 201 and the water is injected thereinto at a pressure 25 p.s.i. above the pressure of the carbon dioxide within the vessel 201, i.e., at a pressure of 95 p.s.i. The water is pumped into the carbonator at a rate of 1⅛ ozs. per second, the amount of retained carbonated water as at 248 being approximately ½ oz., and a typical charge of water to be carbonated being 6¾ ozs., whereby the water to be carbonated flows through the carbonator 200 at a relatively high rate and is not present therein for any substantial period of time. As water is pumped into the carbonator 200, the stream of water entering through the passage 214 is broken up into droplets as at 247 upon striking the baffle 240 and the droplets fall downwardly through the passage 245 as a film along the inner surface of the side wall 202 and to the bottom of the vessel 201; after a small accumulation of inlet carbonated water, the float 265 is lifted by the buoyancy thereof whereby to open the outlet valve 250 by removing the closure member 260 from its position upon the valve seat 258. The amount of upward movement of the float 265 is limited by the upper end of the float 265 striking the bottom of the baffle 240, whereby to insure that the closure member 260 does not move out of registration with the vertical passage 257. The lifting movement of the float 265 and therefore the opening movement of the outlet valve 250 is facilitated by the design of the valve body 255 wherein pressure is exerted through the horizontal passages 259 to assist in lifting the closure member 260. Once the outlet valve 250 is slightly opened, the water can flow around the body 261 due to the triangular cross section thereof, i.e., water can flow through the vertical passage 257, and carbonated water can also flow through the horizontal passages 259, thereby providing a large flow area through the outlet valve 250, the major flow being below the closure member 260. When the pumping of the water into the carbonator 200 ceases, continued outflow of the carbonated water from the lower end of the vessel 201 will eventually permit the float 265 to return to the position illustrated in FIG. 6, thereby to place the closure member 260 against the valve seat 258 to close the outlet valve 250. At this time the slot or groove 264 operates to permit enough carbonated water to flow from the reservoir as at 248 within the vessel 202 downwardly to the outlet pipe 269 and thence down to a dispensing valve (to be described more fully hereinafter), whereby to fill the outlet pipe 269 and thus to equalize the pressure on both sides of the valve seat 258. As a consequence, there will be no partial vacuum in the pipe 269 tending to hold the outlet valve closed at the next dispensing operation and therefore the timing of the opening of the valve 250 will be more precise and more reproducible from one dispensing operation to the next.

In a typical construction of the carbonator 200, the vessel 201 has an internal diameter of 1⅞ inches, a length of 6¼ inches, the baffle 240 has a circumference of 1⅝ inches, the float 265 has a diameter of 1⅝ inches and an overall height of 1¾ inches; the outlet pipe 269 has an internal diameter of 3/32 inch and the groove 264 permits a discharge from the vessel 201 at a rate of 2 cc./sec.

The carbonator 200 works more efficiently if it and the contents thereof are chilled, and to this end a copper sleeve 270 (see FIG. 3) is provided within which is placed the carbonator 200, and specifically the vessel 201 thereof, the copper sleeve 270 fitting closely about the stainless steel outer wall 202 to provide for good thermal transfer therebetween. In addition, a pair of brackets 275 is provided to interconnect the sleeve 270 and the tube 101 forming a part of the ice making mechanism, the brackets 275 each including a first semi-cylindrical portion 276 extending half-way around the adjacent end of the sleeve 270 and secured thereto as by brazing, a second semi-cylindrical portion 277 extending half-way around the adjacent end of the tube 101 and secured thereto as by brazing, and a strap 278 interconnected to semi-cylindrical portions 276 and 277, all to provide good heat transfer and thermal contact between the tube 101 and the sleeve 270.

Figure 7:
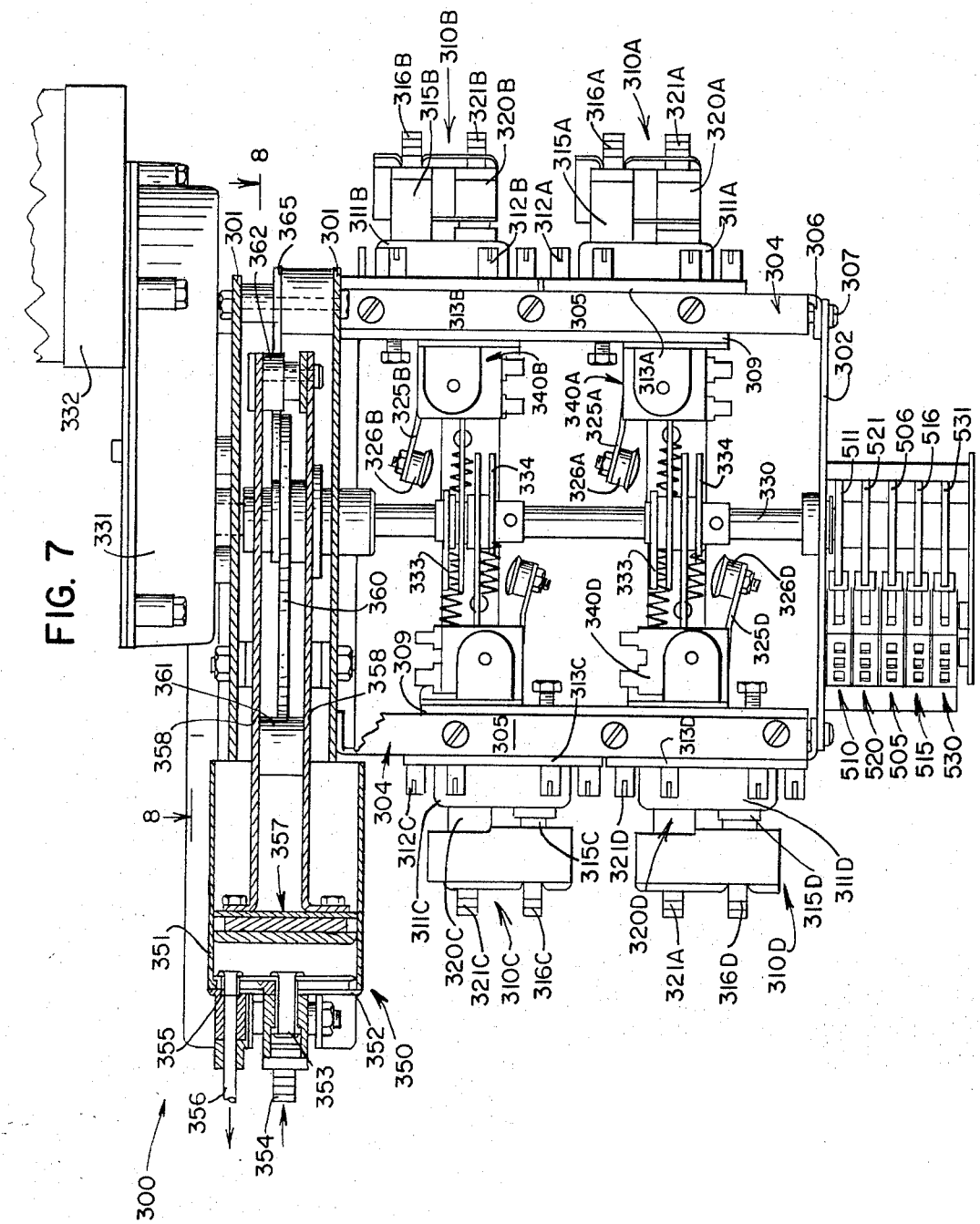
FIG. 7 is an enlarged view in horizontal section through the water pump and also illustrating the syrup pumps and the drive and control mechanism therefor.
Figure 8:
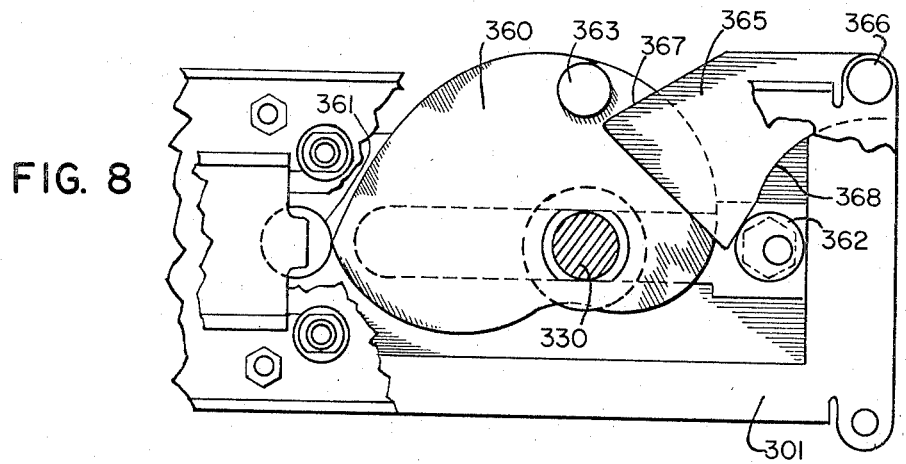
FIG. 8 is a view in vertical section along the line 8—8 of FIG. 7.
Figure 9:
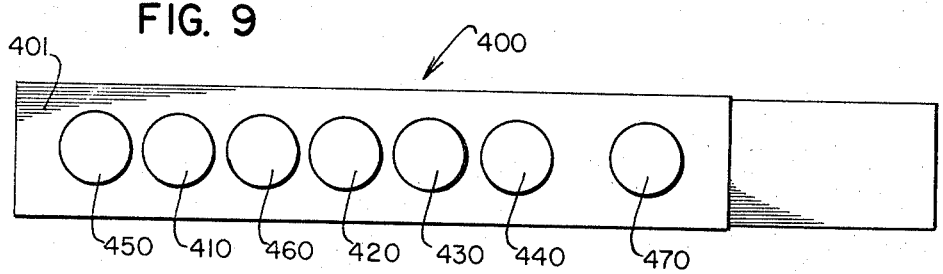
FIG. 9 is an enlarged front elevational view of the manual control switch for the machine of FIG. 1.

Referring to FIGS. 7, 8 and 13 of the drawings, the pumping system 300 forming a part of the machine 20 will be described in detail, the pumping system 300 pumping both the water and flavor syrup to be dispended into the cup 35. Referring first to FIG. 7, the pumping system 300 includes a frame comprising a pair of end plates 301 and 302 that are generally rectangular in shape and are disposed parallel to each other and a pair of opposed and spaced apart side plates 304. Each of the side plates 304 has a pair of longitudinally extending flanges 305 on the top and bottom thereof and a pair of laterally extending end flanges 306 on the ends thereof, the end plates 301 and 302 and the associated end flanges 306 having aligned openings therethrough receiving screws 307 fixedly to interconnect the end plates 301 and 302 with the side plates 304. A pair of inner frame plates 309 is also provided, each of the frame plates 309 being substantially rectangular in shape and having flanges extending outwardly to connect with the flanges 305 on the side plates 304.

As illustrated, four metering pumps have been shown mounted upon the frame, all four metering pumps being substantially identical in construction, whereby like reference numerals have been applied to like parts of the pumps with the addition of the suffixes A, B, C, and D, the four metering pumps being designated 310A, 310B, 310C and 310D, respectively, the following detailed description of the four metering pumps being confined to the description of the metering pump 310A, it being understood that the other three are of identical construction. The metering pump 310A includes a pump housing 311A that is generally cylindrical in shape and contains therein a movable flexible diaphragm (not shown) which is held in position by a plurality of bolts 312A passing through a flange 313A about the periphery of the housing 311A. An inlet valve 315A is provided for the pump 310A having an outwardly projecting connection 316A adapted to be connected to a syrup supply line 317A connecting to a supply of syrup designated 318A (see FIG. 13 also). An outlet valve 320A is also provided for the pump 310A, the outlet valve 320A having a connection 321A connected to a syrup outlet line 322A (see FIG. 13 also).

A piston is provided within the pump 310A connected to the diaphragm therein and operable when moved to the right as illustrated in FIG. 7 to draw syrup through the inlet valve 315A into the pump 310A and operative when moved toward the left in FIG. 7 to force syrup under pressure through the outlet valve 320A and thence to the supply line 322A. The piston (not shown) for causing operation of the pump 310A is connected to an actuating arm 325A which is pivotal and spring biased to the position illustrated in FIG. 7 and also carries on the outer end thereof a cam roller 326A. In order to drive the arm 325A, a shaft 330 is provided journaled in the end plates 301 and 302 and disposed substantially midway between the side plates 304, the shaft 330 having the upper end thereof as illustrated in FIG. 7 connected to a gear reducing mechanism 331 that in turn is driven by a motor 332. Mounted upon the shaft 331 are two opposed pairs of driving cams 333 and 334 for engaging the cam rollers 326A, for example, and 326D, for example, respectively, thereby to impart the driving motion of the rotating shaft 330 to the actuating arms 325A and 325D for the pumps 310A and 310D, respectively. The driving cams 333 and 334 are shaped to provide a full cycle of reciprocation of the connected piston of the associated pump for each cycle of revolution of the drive shaft 330.

In order to provide a drive connection between the actuating arm 325A, for example, and the cam 333, the arm 325A must be swung downwardly to place the roller 326A thereof in alignment with the cam 333, such movement of the actuating arm 325A being controlled by a solenoid 340A. More specifically, the actuating arm 325A is continually urged downwardly by means of a spring (not shown) toward a position in engagement with the cam 333, the solenoid 340A having an arm (not shown) normally holding the actuating arm 325A out of engagement with the cam 333. In a typical cycle of operation of the syrup pumping portion of the pumping system 300, the normally de-energized motor 332 is energized and one of the normally de-energized solenoids, such as the solenoid 340A, is also energized, thereby moving the actuating arm 325A into engagement with the drive cam 333 and to cause one revolution of the drive shaft 330, thus to cause one intake and exhaust motion of the pump 310A. This serves to move a carefully predetermined quantity of syrup from the source 318A through the pump 310A to the output line 322A, after which all of the parts are de-energized and returned to the positions illustrated in FIGS. 7 and 13. Further details of the construction and operation of the syrup pumping portion of the pumping system 300 are disclosed in the copending application for United States Letters Patent Ser. No. 476,421 filed Aug. 2, 1965, by Donald S. Reynolds and Harvey R. Krueger for Metering Pump and System.

Also forming a part of the pumping system 300 is a water pump generally designated by the numeral 350, the water pump 350 being mounted upon the same frame and driven by the same drive shaft 330 as the syrup pumps described above. More specifically, the water pump 350 includes a cylindrical housing 351 forming a cylinder and provided on the outer or lefthand end thereof as viewed in FIG. 7 with a head 352. Mounted in the head 352 is an intake valve 353 communicating between an input connector 354 and the interior of the cylinder 351, and also mounted in the head 352 is an outlet port 355 having an output connection 356 therefor. Mounted within the cylinder 351 is a piston head 357 including the usual sealing construction and having a pair of rearwardly directed parallel arms 358 connected thereto and journaled for reciprocating movement horizontally as viewed in FIGS. 7 and 8.

In order to move the piston 357 to cause the pump 350 to operate, a special shaped cam 360 is fixedly mounted upon the drive shaft 330 to be driven thereby, the shape of the cam 360 being best seen in FIG. 8 of the drawings.

n order to cause the cam 360 to drive the piston 357, the rms 358 carry a pair of rollers 361 and 362 which enage the cam 360 to give positive control of the movement of the piston 357. The cam 360 also carries a stud 63 mounted thereon for engagement with an arm 365 or use in causing a quick intake stroke for the pump 350, he arm 365 being pivoted as at 366 to the frame and having a first cam surface 367 engageable with the stud 363 nd a second cam surface 368 engageable with the rear r righthand roller 362 as viewed in FIGS. 7 and 8. The arts as illustrated in FIGS. 7 and 8 are shown at the eginning of the intake cycle with the piston 357 to the xtreme lefthand position thereof. During the first portion f the revolution of the drive shaft 330, a very rapid ntake stroke is accomplished by means of the cam 360 in cooperation with the stud 363 driving the arm 365 against he rear roller 362, after which a constant volume discharge stroke is provided so that the water is discharged rom the pump 350 at a constant steady rate during all f the discharge portion of the operating cycle thereof.

Figure 10:
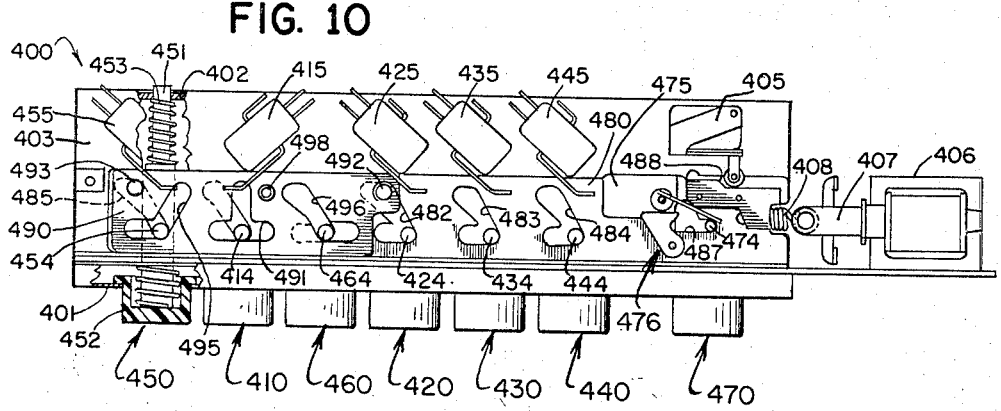
FIG. 10 is a top elevational view of the control switch illustrated in FIG. 9.

In order to select the flavor and character of beverage o be dispensed by the machine 20, the push button selector mechanism 400 has been provided, the construction and operation of which are best illustrated in FIGS. , 10 and 13 of the drawings. The selector mechanism 400 includes a front frame 401, a rear frame 402 and horizontal frames 403 interconnected to support and house the other portions of the mechanism. Seven different selector buttons are provided as follows: a first flavored carbonated drink selector 410, a second flavored carbonated drink selector 420, a third flavored carbonated drink selector 430, a fourth flavored carbonated drink selector 440, a first flavored non-carbonated drink selector 450, a second flavored non-carbonated drink selector 460, and a "no-ice" drink selector 470. There also is mounted upon the upper housing member 403 a first slide bar 480 on top of which is mounted a second slide bar 490, the slide bars 480 and 490 moving in a lateral direction as viewed in FIG. 10 and a vertical direction as viewed in FIG. 13 upon the actuation of a selected one of the various push buttons. For example, in a typical push button 450, a shaft 451 is journaled in the frame of the mechanism and is provided with an outer head or button 452 and with a spring 453 disposed between the rear wall 402 and the head 452 so as to urge the head 452 to the outermost position. The shaft 451 has a pin 454 extending upwardly through associated slots 485 and 495 in the slide bars 480 and 490, respectively, the pin 454 engaging and actuating an associated control switch 455 when the button 452 is fully compressed. It further will be noted that movement of the pin 454 inwardly will cause the bottom slide bar 480 to move to the right due to the shape of the slot 485, and such movement of the pin 454 will simultaneously cause movement of the top slide bar 490 to the left due to the shape of the slot 495 therein. Such movement of the upper slide bar 490 to the left causes a pin 498 carried thereby to actuate a second control switch 415 associated therewith.

It will be understood that each of the push button mechanisms 410, 420, 430, 440, 460 and 470 is constructed and operates in a like manner except that: the mechanism 410 moves only the bottom slide bar 480 to the right when pushed inwardly, thus to operate the associated switch 415; the selector 420 also moves only the lower slide bar 480 to the right and operates an associated switch 425; the selector 430 moves only the bottom slide bar 480 to the right and operates an associated switch 425; the selector 430 moves only the bottom slide bar 480 to the right and operates an associated switch 435; the selector 440 moves only the bottom slide bar 480 to the right and operates an associated switch 445; the selector 460 moves both the lower slide bar 480 and the upper slide bar 490 to the right to cause a pin 492 thereon to operate the switch 425 and to cause a second pin 493 thereon to operate the switch 455. Finally, the push button selector 470 can be operated only after one of the selectors 410 through 460 has been operated, actuation of tthe selector 470 operating an associated switch 475, the switch 475 being held in the actuated position by a holding pawl 476 pivotally mounted upon the slide bar 480. More specifically, and referring also to FIG. 13, it will be seen that when the slide bar 480 is shifted to the full actuated or down position thereof, the pin 474 is moved into engagement under the nose of the pawl 476. If the user now pushes the "no ice" push button 470, the pin 474 will be moved to the right and in doing so will cam away the pawl 476, causing the pawl 476 to rotate in a counterclockwise direction against a spring (not shown) urging the pawl 476 to the position illustrated in FIG. 13. Having passed by the nose of the pawl 476, the pin 474 operates the switch 475, and since the pawl 476 has now returned to its normal position, the pin 474 is engaged upon an outer flat surface 477 of the pawl 476 to hold the pin 474 and the switch 475 in the actuated positions thereof. Subsequent movement of the slide baar 480 to the upper or rest position thereof disengages the pawl 476 from the pin 474 permitting the push button 470 to be returned to the rest position thereof and permitting the switch 475 to return to the non-actuated position thereof.

Movement of the slide bar 480 to the right moves a cam surface 488 carried thereby also to the right that serves to operate a switch 405 which serves to energize a holding relay 406 connected to the slide bar 480 and operative to hold the slide bar 480 in the righthand or actuated position thereof, the armature 407 of the solenoid 406 being connected by means of a spring 408 to the slide bar 480.

Figure 11:
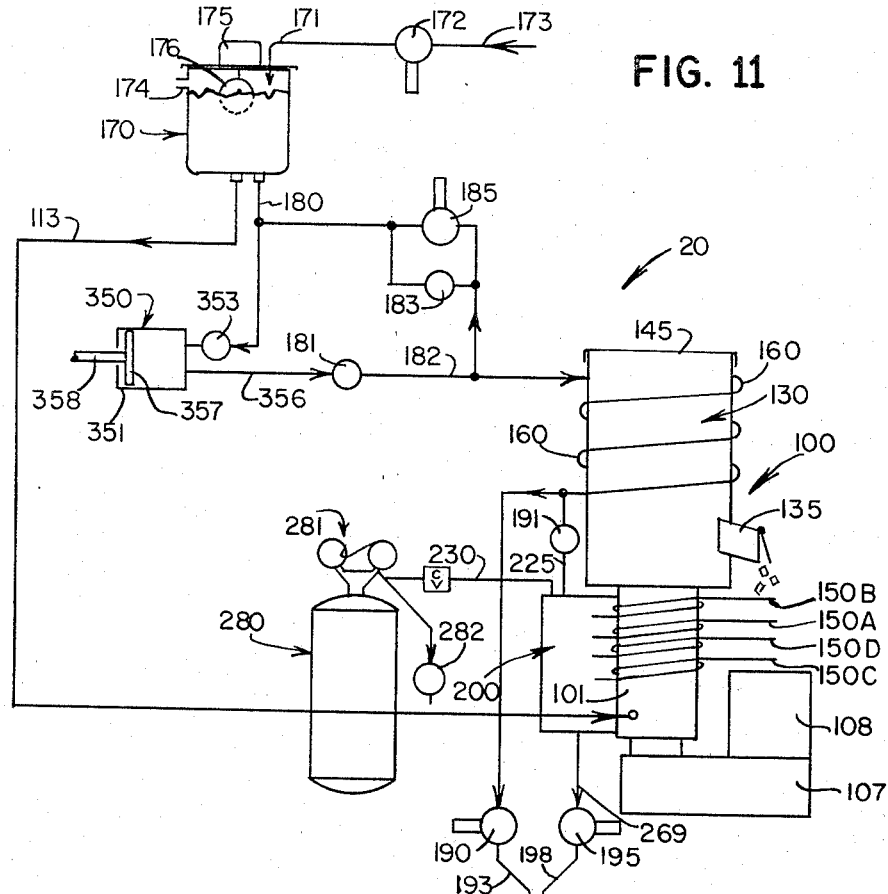
FIG. 11 is a schematic and diagrammatic view of the hydraulic system forming a part of the machine of FIG. 1.

Further details of the water system for the machine 20 are best illustrated in FIG. 11 of the drawings, wherein it will be seen that there is provided a water level control chamber 170 having a water inlet 171 connected through a water inlet valve 172 to a source 173 such as the municipal water supply. An overflow outlet 174 is provided together with a low water switch 175 controlled by a float 176 operatively connected thereto. One outlet from the chamber 170 is connected to the supply line 113 for supplying water to the bottom of the ice cube making apparatus 100. A second outlet supplies water to the water pump 350 and specifically to a supply line 180 therefor that supplies water to the inlet check valve 353. The water from the pump 350 passes through an outlet check valve 181 and enters an output line 182 that connects with an input to the cooling coil 160 disposed about the storage hopper 130. The line 182 also connects with a pressure relief valve 183 by which water can be bypassed back to the supply chamber 170 and also connects with a bypass valve 185 that is solenoid operated and which when open also serves to divert a predetermined portion of the water in the line 182 back to the supply reservoir in the chamber 170. The water from the outlet of the cooling coil 160 can pass either to a still water dispensing valve 190 that is solenoid controlled or through the carbonator 200 and more specifically through an input check valve 191 therefor in the water inlet line 225 thereto, and after passing through the carbonator 200 thus through the outlet pipe 269 to a second solenoid controlled dispensing valve 195 which when open serves to dispense the carbonated water in the line 269. There also is illustrated in FIG. 11 the connection to the carbonator 200 of a source of carbon dioxide gas such as the high pressure container 280 having the usual controls 281 and a relief valve 282 and connected by the pipe 230 to the carbon dioxide inlet for the carbonator 200.

Figure 12:
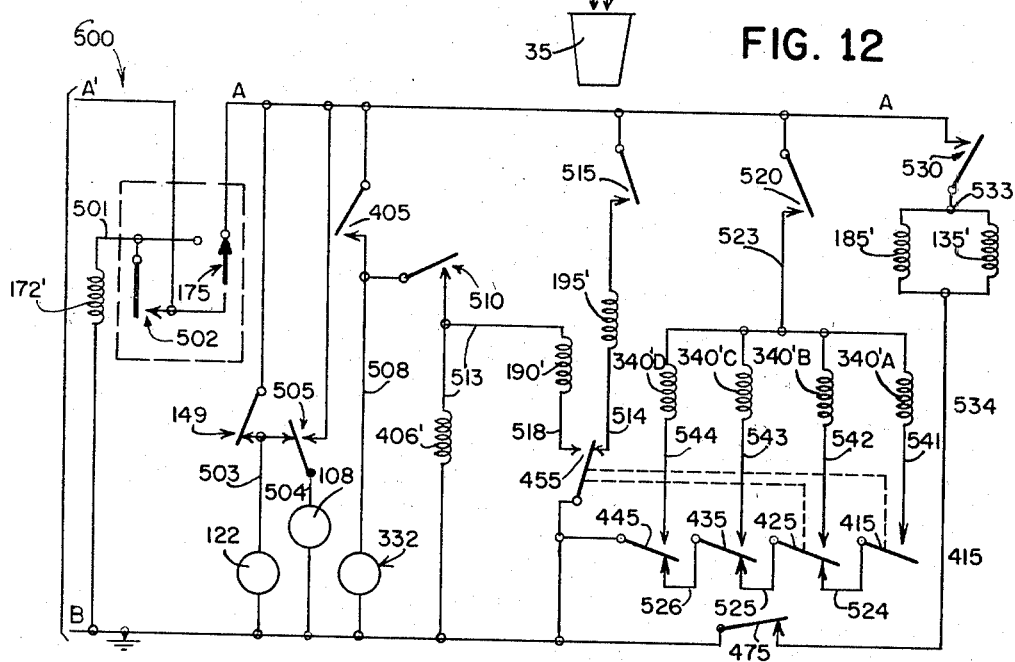
FIG. 12 is a schematic and diagrammatic view of the electrical circuit for the machine of FIG. 1.

There are illustrated in FIG. 12 of the drawings certain of the electrical connections for the principal parts of the machine 20, the input to the electrical circuit of FIG. 12 being on a pair of line conductors designated A' and B and connected through suitable switches and fuses (not shown) to a suitable 118 volt 60 cycle A.C. supply. As illustrated the conductor A' is connected to one terminal of the low water switch 175, the other terminal of the low water switch 175 being connected to the main conductor A, whereby if the low water switch 175 is open due to an insufficient supply of water to the chamber 170, all electrical power to the machine 20 is interrupted. A low level of water in the chamber 170 causes the switch arm of the switch 175 to move into contact with a conductor 501 which is connected to one terminal of the coil 172' for the inlet water valve 172, thereby causing additional water to be admitted to the chamber 170 until the low water switch 175 moves back to the normal position illustrated in FIG. 12, at which time electrical power is again supplied to the main conductor A. A water switch 502 is also provided to interconnect the conductor 501 to the main conductor A' thus to provide operating potential to the solenoid coil 172' to open the valve 172, thus to supply additional water to the chamber 170.

It further will be seen that the conductor B is connected to one of the input terminals of the compressor motor 122 and to one of the input terminals to the ice making motor 108 and to one terminal of the pump motor 332 to supply electrical potentials thereto. The other terminal of the compressor motor 122 is connected by a conductor 503 to the normally closed ice level switch 149 (see FIG. 2 also) which in turn connects to the main conductor A, so that the compressor motor 122 is operated so long as there is a demand for ice in the storage hopper 160, i.e., so long as the storage hopper 160 is not completely filled so as to open the switch 149 by ice pressing against the diaphragm 147. The other terminal of the ice maker motor 108 is connected by a conductor 504 to a switch 505 which when in the lefthand position illustrated in FIG. 12 connects through the switch 149 to the main conductor A so that the auger 105 driven by the motor 108 operates so long as there is a demand for ice in the storage hopper 160. The switch 505 has a second position to the right wherein it is connected directly to the conductor A, the switch 505 being a cam operated switch mounted adjacent to the lower end of the main drive shaft 330 (see FIGS. 7 and 13 also), the cam 506 for operating the switch 505 being driven by the shaft 330, the switch 505 being more particularly operated by a cam follower 507 engaging the periphery of the cam 506 during the major portion of the time that the water and syrup pump drive motor 332 is operating. The other terminal of the pump motor 332 is connected by a conductor 508 through the switch 405 in the control mechanism (see FIGS. 10 and 13 also) to the main conductor A, whereby the pump motor 332 is operated each time that the push button control switch 405 is closed. The conductor 508 also connects to a cycle switch 510 that is another cam operated switch on the pump drive shaft 330 (see FIGS. 7 and 13 also). More specifically, the switch 510 is controlled by a cycle cam 511 fixedly mounted on the drive shaft 330 and contacted by a cam follower 512 that serves to operate the switch 510, the switch 510 being closed during substantially the full cycle of operation of the motor 332. The other contact of the cycle switch 510 is connected to a conductor 513 which is in turn connected to one terminal of the coil 406' for the lock solenoid 406, the other terminal of the coil 406' being connected to the main conductor B. In the operation of the machine 20, the switch 405 is manually closed by the user in selecting a drink, the switch 405 being closed long enough to energize the pump meter 332 for a sufficient period of time to close the cycle switch 510, the lock solenoid coil 406' being energized and serving to hold the switch 405 in the closed position until the pump motor 332 has turned the drive shaft 330 through a complete revolution, after which the cycle switch 510 is opened, this de-energizing the lock solenoid coil 406' which causes the switch 405 to open thus de-energizing the pump drive motor 332.

The conductor 513 is also connected to one terminal of the solenoid coil 190' for the non-carbonated dispensing valve 190, the other terminal of the coil 190' being connected to one terminal of the non-carbonated control switch 455, the other terminal of the switch 455 being connected by a conductor 514 to one terminal of the solenoid coil 195' of the carbonated drink dispensing valve 195, the other terminal of the coil 195' being connected to one terminal of a carbonated water control switch 515 that is also cam controlled from the drive shaft 330, there being a cam 516 mounted on the drive shaft 330 and engaging a switch actuator 517 acting as a cam follower thereon. The other terminal of the carbonated water switch 515 is connected to the main conductor A. A fourth cam operated switch 520 is provided having one terminal thereof connected to the main conductor A and having the other terminal thereof connected to a conductor 523, the switch 520 being a syrup pulse switch that is controlled by a cam 521 fixedly mounted on the drive shaft 330 and having a cooperating cam follower 522 thereon that actuates the syrup pulse switch 520. Each of the four syrup pump solenoids 340A, 340B, 340C and 340D has a corresponding solenoid coil 340'A, 340'B, 340'C, and 340'D having one terminal thereof connected to the conductor 523 and the other terminal thereon respectively connected to the associated push button actuated control switch 415, 425, 435, and 445, the switch 415 being connected by a conductor 524 to the switch 425, and the switch 425 being connected by a conductor 525 to the switch 435 and the switch 435 being connected by a conductor 526 to the switch 445 and the switch 445 in turn being connected to the main conductor B. Finally, a fifth cam operated control switch 530 is provided, this being a bypass and ice dispensing control switch having one terminal thereof connected to the conductor A and the other terminal thereof connected to a conductor 533. The switch 530 is more particularly controlled by a cam 531 mounted on the pump shaft 330 and having associated therewith a cam follower 532 that engages the switch 530 to cause closure thereof for the desired predetermined portion of a dispensing cycle. The conductor 533 is connected to one terminal of the solenoid coil 185' of the bypass valve 185 and is also connected to one terminal of a solenoid coil 135' controlling the opening of the door 135 for the ice hopper 130 for the dispensing of ice into the cup 35. The other terminals of the solenoid coils 135' and 185' are connected together and by a conductor 534 to one terminal of the normally closed "no ice" switch 475 (see FIGS. 10 and 13 also), the other terminal of the switch 475 being connected to the conductor B.

Referring now to FIG. 5 of the drawings, there is shown a typical cycle diagram for the machine 20 illustrating the time that different events occur and different parts are actuated after the beginning of a dispensing cycle. Assuming that a carbonated and iced drink is to be dispensed such as by pushing the selector button 410 in FIG. 10, the pump motor 332 is first actuated and the water pump 350 completes the intake stroke thereof, the intake stroke lasting for approximately 90° of rotation of the shaft 330. At the 45° point of the diagram the water pump 350 begins to deliver water at a constant rate and continues to do so from a 45° point to the 300° point in the cycle. At the 37° point in the cycle, the syrup pulse switch 520 is closed and remains closed for 20°, whereby syrup delivery is commenced at the 57° point and continued through the 315° point in the cycle. At the 70° point, the carbonated water dispensing valve 195 is opened and remains open through the 345° point in the cycle of operation. At the 255° point, the ice dispensing door 135 is opened to dispense ice into the container 135, this being the final ingredient in the three component drink comprising carbonated water, syrup and ice. If on the other hand still water is to be used in the place of carbonated water, the still water dispensing valve 190 is opened at the 37° point and remains open through the 308° point in the cycle of operation.

Referring now to FIG. 13 of the drawings, there is shown a schematic representation of the entire dispensing machine including all of the interconnections of the several parts thereof, the following being a description of the complete operation of the machine 20 with particular reference to FIG. 13. In preparation for operation of the machine 20, water must be connected thereto through the supply line 173 (see FIG. 11 also), the electrical connections must be made thereto on the conductors A' and B (see FIG. 12 also) and a source of carbon dioxide gas such as the cylinder 280 must be connected as illustrated in FIG. 11; it further is assumed that the ice making apparatus 100 is operated for a sufficient period of time to provide a quantity of ice cubes in the storage hopper 130 and to cool the several syrup coils 150A, 150B, 150C and 150D and to cool the water coil 160 and to cool the vessel 201 of the carbonator 200 to the desired low operating temperature thereof.

Assuming now that the user desires to obtain from the machine 20 a carbonated drink with ice, he pushes any one of the push buttons 410, 420, 430 and 440, depending upon the flavor he desires, and for the purpose of description of a first dispensing cycle, it will be assumed that the user has operated push button 410. Operation of the push button 410 serves to move the slide bar 480 downwardly as viewed in FIG. 13, the pin 414 engaging the associated slot 481 in the bar 480. Movement of the bar 480 first actuates the push button locking switch 405 by contact with the cam surface 488 whereby to establish an electrical circuit from the conductor A through the switch 405 and through the conductor 508 to one terminal of the motor 332, the other terminal of the motor 332 being connected to the other conductor B. The motor 332 accordingly begins to operate and turns the shaft 330 and all the cams mounted thereon including the cam 511 which controls the cycle switch 510, the cycle switch 510 being closed immediately after initiation of the operation of the motor 332. Closure of the cycle switch 510 serves to energize the lock solenoid 406, whereby to hold the slide bar 480 in the actuated position thereof, the parts being held in this position until one revolution of the drive shaft 330 at which time the cycle switch 510 is opened. It will be noted that there will be no movement at this time of the upper slide bar 490 due to the shape of the slot 491 therein.

Such inward movement of the push button 410 also causes the pin 414 to close the control switch 415, the locking of the slide bar 480 in the actuated position likewise locking the switch 415 closed until such time as the holding solenoid 406 is de-energized. As soon as the pump motor 332 is operated, the water pump 350 completes its rapid intake stroke which lasts for 37° rotation of the shaft 330, after which the pump 350 shifts to the discharge cycle thereof and discharges water through the pipe 182 and thence into the cooling coil 160 about the ice hopper 130, the water being cooled in passing through the coil 160. After leaving the cooling coil 160, the water enters the carbonator 200 through the check valve 191, the water being carbonated as has been described more fully hereinabove. It merely being point out here that the water is substantially instantaneously carbonated in passing through the vessel 201, an accumulation of the carbonated water in the lower end of the vessel 201 quickly opening the discharge valve 250 at the lower end thereof. At the 70° point in the rotation of the shaft 330, the carbonated water valve 195 is opened by means of the switch 515, whereby the carbonated water in the discharge pipe 269 from the carbonator 200 can flow through the carbonator water valve 195 and from the outlet pipe 198 into the cup 35 in position beneath the discharge therefrom.

Prior to the time that the carbonated water valve switch 515 is closed, the syrup pulse switch 520 is closed for a 20° sector of rotation of the shaft 330 thereby to energize the associated control solenoid 340A so as to place the cam follower 326A in driving contact with the cam 333, the parts being held in this position during the entire syrup delivery time even though the syrup pulse switch 520 is shortly thereafter opened, all this taking place because switch 415 has been closed by actuation of the push button 410 and held in the closed position by the action of the lock solenoid 406 holding the slide bar 480 in the actuated position thereof. Since the associated syrup pump 310 A is now operating, syrup is delivered and delivery of the syrup is continued through the 315° rotation point of the control shaft 330 (see FIG. 5 also). The syrup is moved from the supply source 318A thereof through the pump 310 and the discharge pipe 322A and through the associated cooling coil 150A disposed about the tube 101, and specifically the refrigerating coil 115 thereof, to be cooled thereby after which the syrup is discharged through the discharge line 151A into the cup 35 disposed in alignment therebelow.

Both water and syrup are now flowing into the cup 35, and after 255° rotation of the control shaft 330, the ice dispensing switch 530 is closed, this completing a circuit for the ice dispensing solenoid 135' which opens the discharge door 135 in the ice storage hopper 130, ice being dispensed into the cup 35 therebelow until the control shaft 330 reaches approximately the 345° point at which time the switch 530 is opened to de-energize the solenoid 135' which causes closure of the door 135 on the ice storage hopper 130. At the same time that the ice dispensing solenoid 135' is energized, the solenoid 185' is energized to open the water bypass valve 185, sufficient water from the water pump 350 being diverted back to the supply chamber 170 to compensate for the ice added during the dispensing cycle.

At the 300° point in the operation of the control shaft 330, the water delivery pump 350 ceases to operate, the syrup delivery stops at 315° and the carbonated water valve 195 is closed at 345°, and finally at the 360° point the cycle switch 510 opens to end the dispensing cycle. Opening of the cycle switch 510 de-energizes the lock solenoid 406 thus permitting the slide bar 480 to be returned by springs therefor into the return position thereof, thus returning all of the parts to the normal position illustrated in FIG. 13. The parts are now in position to initiate a second dispensing cycle.

Assuming now that a non-carbonated drink using the same flavor syrup as described above is desired in a second beverage dispensing cycle, the user simply pushes push button 450 rather than the push button 410. This causes movement of the upper slide bar 490 to the left as viewed in FIG. 10 and upwardly as viewed in FIG. 13 to cause the pin 498 to engage the switch 415, whereby to repeat all of the resultant action which flows therefrom with the exception of the opening of the carbonating water valve 195. The carbonated water valve 195 does not open because the pin 454 also engages and actuates the switch 455 so as to cause connection to the conductor 518. As a result, a circuit is established to energize the solenoid 190' controlling the opening of the non-carbonated dispensing valve 190, while simultaneously preventing opening of the carbonated water valve 195. As a result, the non-carbonated water valve 195 is opened after 37° rotation of the control shaft 330 (see FIG. 5), whereby as soon as the water pump 350 begins to discharge, water is forced through the cooling coil 160 and then through the pipe 192 to the now open valve 190 and from the valve 190 through a discharge pipe 193 into the waiting cup 35. Discharge of the still water or non-carbonated water continues through the 300° point of rotation of the control shaft 330. In all other respects, the second illustrative dispensing cycle is the same as the first illustrative dispensing cycle, whereby there is delivered to the cup 35 still or non-carbonated water, a measured quantity of the desired syrup from the supply source 318A and a measured quantity of ice cubes from the ice storage hopper 130.

At the end of the second illustrative dispensing cycle, it may be desirable to have a third illustrative dispensing cycle wherein the same flavored drink as in the first illustrative dispensing cycle is provided with carbonated water but no ice. In such a dispensing cycle, the user first pushes the push button 410 to cause a dispensing cycle entirely like the first dispensing cycle except with respect to the dispensing of ice and the bypassing of a portion of water. Immediately after pushing the push button 410, the user then pushes the "no ice" push button 470, thereby to open the switch 475, the parts being held in this position by the holding pawl 476 until the return of the slide bar 480 to the rest position thereof. Opening of the switch 475 renders the closing of the ice dispensing switch 530 ineffectual, since there is no potential applied to the ice dispensing solenoid coil 135' and the water bypass valve coil 185' (see FIG. 12 also). As a result, no ice is dispensed from the ice storage hopper 130 and no portion of the discharge from the water pump 350 is bypassed through the valve 185, whereby the full 6¾ oz. discharge from the pump 350 is delivered to the waiting cup 35. As a result, the contents of the cup 35 will be only carbonated water and the desired flavor syrup, there being no ice therein.

It further is pointed out that other illustrative dispensing cycles like the first dispensing cycle above can be produced by pushing the push buttons 420, 430 or 440 in the place of the push button 410, whereby to repeat the first illustrative dispensing cycle with the exception of substituting a different flavored syrup by actuating a different one of the control solenoids 340B, 340C or 340D, as the case may be, for controlling the appropriate syrup pump. Likewise another non-carbonated dispensing cycle like the second illustrative dispensing cycles above can be obtained by pushing the push button 460, this serving to provide a non-carbonated beverage supplied with the flavored syrup from the source 318B; in this type of dispensing cycle, the switch 425 is operated by the slide bar 490 being moved so as to cause the pin 492 to operate the switch 425, such movement of the slide bar 490 also causing the pin 493 to actuate the switch 455. Finally, it is pointed out that the "no ice" push button 470 can be actuated after actuation of any one of the other push buttons 410 through 460, whereby to provide an appropriate drink without any ice therein.

Figure 14:
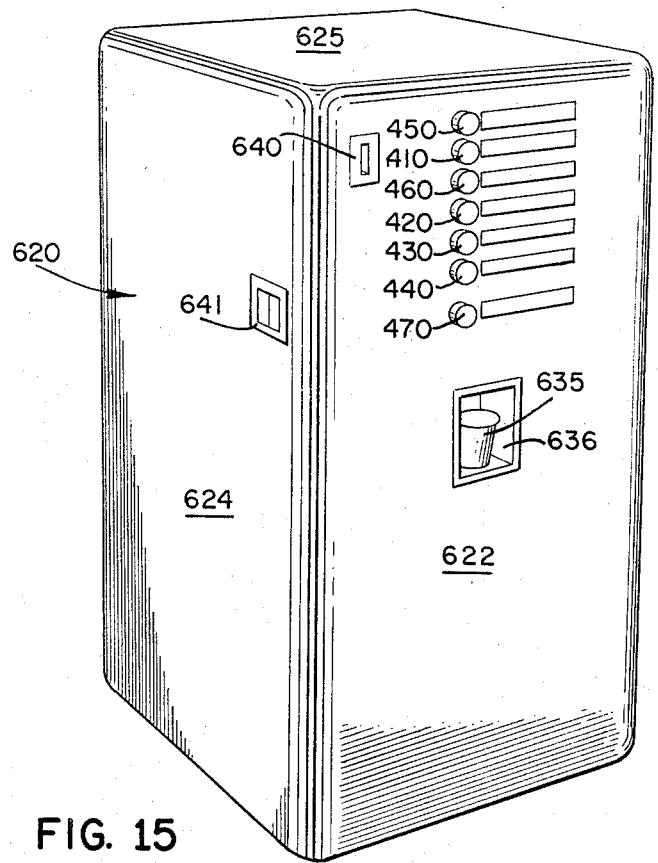
FIG. 14 is a perspective view of the front of a second embodiment of a beverage dispensing machine of the present invention, the machine being coin operated.
Figure 15:
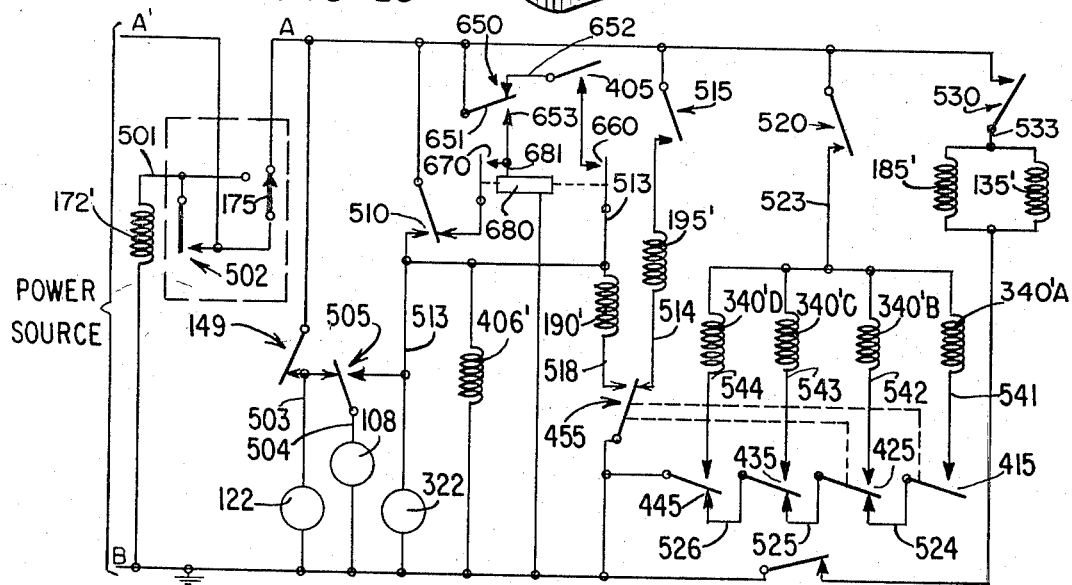
FIG. 15 is a schematic and diagrammatic view of the electrical control circuit for the coin operated machine of FIG. 14.

There is shown in FIGS. 14 and 15 of the drawings a coin actuated version of the machine 20 of FIG. 1, the machine of FIG. 14 being generally designated by the numeral 620. A housing is provided for the machine 620 including a front wall 622, a pair of side walls 624, a top wall 625 and a rear wall (not shown). The machine 620 preferably contains an automatic cup dispensing mechanism (not shown) which serves to deliver a cup 635 to a dispensing station 636 mounted on the front wall 622 and accesisble through an opening therein. Several push buttons 410 through 470 are also provided extending through openings in the front wall 622, the same reference numerals having been applied since the parts are identical to those described hereinabove. The only other modification of the machine 20 to provide the machine 620 is the incorporation therein of the coin actuated control mechanism which includes a coin input slot 640 mounted in the front wall 622 and the rejected coin receptacle 641 mounted in one of the side walls 624.

There is illustrated in FIG. 15 of the drawings the only modification in the electrical circuit necessary to accommodate coin controlled operation, all of the parts common to the control circuit for the machine 20 described above with respect to FIG. 12 having been given like reference numerals herein. The modification in the diagram consists in adding a coin actuated switch 650 having a movable contact 651 connected to the main conductor A and normally disposed against a switch contact 652 that is connected to the movable contact of the switch 405. The other contact of the switch 405 is connected to a solenoid controlled switch 660 which has the other terminal thereof connected by the conductor 513 to on terminal of the non-carbonated solenoid coil 190', the lock solenoid coil 406' and one terminal of the cycl switch 510. The other terminal 653 of the switch 650 i connected to one terminal of a switch 670 that is also solenoid controlled and has the other terminal thereo connected to a second terminal on the cycle switch 510 The solenoid control switches 660 and 670 are controlled by a solenoid 680 having one terminal thereof connected by a conductor 681 to the switch contact 653 and one terminal of the switch 670 and having the other terminal thereof contacted to the main line conductor B. I all other respects, the circuit 615 is connected as is the circuit of FIG. 12.

In the operation of the circuit of FIG. 15, a coin is inserted through the coin slot 640 and if it passes the rejector mechanism (not shown), it serves to close the coin switch 650 which momentarily energizes the relay 680 which closes the relay switches 660 and 670, the switch 670 serving as a holding contact for the relay 680. Immediately after the coin passes the switch 650, it returns to the position illustrated, i.e., the switch arm 651 agains the contact 652, whereby the circuit can now be controlled by the push button mechanism 400. The user now pushes one of the push buttons 410 through 460, thereby to close the switch 405 thus energizing the pump motor 332, a very short period of operation of the pump motor 332 actuating the cycle switch 510 and holding the cycle switch 510 actuated until the dispensing operation is completed. I will be understood that the actuation of the switch 510 will interrupt the holding circuit for the relay 680, thus permitting the switches 660 and 670 to return to the positions illustrated in FIG. 15. The circuit is now made for the motors 108 and 332 through the switch 510 and also for the lock solenoid 406' and for the non-carbonated solenoid 190' through the cycle switch 510 to the main conductor A. The remaining portion of the operating cycle of the circuit of FIG. 15 is identical to that described above with respect to FIGS. 12 and 13.

From the above it will be seen that there has been provided a beverage dispensing machine which fulfills all of the objects and advantages set forth above. More specifically, there has been provided a beverage dispensing machine that can produce a large variety of drinks including iced drinks, non-iced drinks, carbonated drinks, non-carbonated drinks, and all in any one of four selected flavors. The improved beverage dispensing machine has small overall dimensions in relation to the capacity thereof, the machine producing substantially continuously and at a high rate ice cubes possessing the desired characteristics and carbonated water possessing the desired characteristics, whereby the machine can readily fit upon counters and shelves in cafeterias, restaurants, soda fountains, drive-in restaurants and the like. In the operation of the beverage dispensing machine, the refrigeration system for the ice cube making apparatus serves also to cool both the flavor syrups and the water utilized in the drinks, as well as cooling the carbonator to insure efficient high capacity operation thereof, the cooling coils for the cooling syrup being placed in direct thermal contact with the refrigerating coil for the ice maker and the cooling coil for the water being placed in direct thermal contact with the ice cube storage hopper. There further has been provided an improved carbonator and carbonating system wherein a predetermined charge of water is forcefully injected into a carbonating atmosphere, the water being broken up into droplets to obtain maximum exposure to the carbonating atmosphere and thereafter immediately discharged to a dispensing station, whereby there is provided substantially instantaneous carbonation. The bypass valve associated with the water pump has been provided so that when ice is added to a drink to be dispensed, a quantity of water equivalent to the volume of ice is diverted from the output of the pump so that drinks containing ice cubes and drinks not containing ice cubes all have the same volume, the stirrer in the ice storage hopper being actuated even though no ice is to be dispensed so as to insure good cooling of water passing through the water cooling coil mounted on and in thermal contact with the ice cube storage hopper. Finally, improved control mechanism and control circuits have been provided for beverage dispensing machines, both a manually actuated control mechanism and a coin actuated control mechanism having been provided.

While there have been described what are at present considered to be certain preferred embodiments of the invention, it will be understood that various modifications can be made therein, and it is intended to cover in the appended claims all such modifications as fall within the true spirit and scope of the invention.

What is claimed is:

1. In an iced beverage dispensing machine, the combination comprising an upstanding tube having an inner wall and an outer wall, said inner wall defining an upstanding cylindrical freezing chamber having an outlet at the upper end thereof, an inlet for supplying water to said freezing chamber, means for cooling said tube to freeze water in said freezing chamber, an upstanding auger in said freezing chamber for scraping ice from said inner wall and for delivering the ice to said outlet, drive mechanism for operating said auger to force the ice from said chamber and through said outlet, and a cooling conduit in thermal contact with the outer wall of said tube for cooling flavor syrup flowing through said conduit.

2. The combination set forth in claim 1, wherein said cooling conduit is supported on said tube.

3. The combination set forth in claim 1, wherein said cooling conduit is a coil wrapped around and supported by and in thermal contact with the outer wall of said tube.

4. The combination set forth in claim 1, wherein a plurality of cooling conduits is provided in the form of a corresponding plurality of coils wrapped around said tube and supported thereon and in thermal contact therewith for cooling a corresponding plurality of flavor syrups flowing through said conduits.

5. In an iced beverage dispensing machine, the combination comprising an upstanding tube having an inner wall and an outer wall, said inner wall defining an upstanding cylindrical freezing chamber having an outlet at the upper end thereof, an inlet for supplying water to said freezing chamber, a refrigerant coil disposed about said outer wall and in good thermal contact therewith for cooling said tube to freeze water in said freezing chamber, an upstanding auger in said freezing chamber for scraping ice from said inner wall and for delivering the ice to said outlet, drive mechanism for operating said auger to force the ice from said chamber and through said outlet, and a cooling conduit in thermal contact with said refrigerant coil for cooling flavor syrup flowing through said conduit.

6. The combination set forth in claim 5, wherein said cooling conduit is a coil wrapped around and supported by and in thermal contact with said refrigerant coil.

7. The combination set forth in claim 5, wherein a plurality of cooling conduits is provided in the form of a corresponding plurality of coils wrapped around said refrigerant coil and supported thereon and in thermal contact therewith for cooling a corresponding plurality of flavor syrups flowing through said conduits.

8. In an iced beverage dispensing machine, the combination comprising an upstanding tube having an inner wall and an outer wall, said inner wall defining an upstanding cylindrical freezing chamber having an outlet at the upper end thereof, an inlet for supplying water to said freezing chamber, means for cooling said tube to freeze water in said freezing chamber, an upstanding auger in said freezing chamber for scraping flaked ice from said inner wall and for delivering the flaked ice to said outlet, an extruding head positioned above and spaced from the upper end of said auger in said outlet and having an ice compressing and ice shaping passage therethrough, drive mechanism for operating said auger to force the flaked ice from said outlet into and through said ice passage, an ice blocking member for periodically substantially blocking the outlet of said ice passage to compress and to congeal the particles of flaked ice therein to form in said ice passage a rod of compact and coherent ice, and a cooling conduit in thermal contact with the outer wall of said tube for cooling flavor syrup flowing through said conduit.

9. The combination set forth in claim 8, wherein said extruding head has a plurality of circumferentially arranged ice compressing and ice shaping passages therethrough, and said ice blocking member periodically substantially blocks the outlets of said ice passages to compress and congeal particles of flaked ice therein to form in said ice passages rods of compact and coherent ice.

10. The combination set forth in claim 8, and further comprising an ice cutter driven by said drive mechanism for breaking the rod of compact and coherent ice into individual compact and coherent ice cubes as the rod issues from said ice passage.

11. In an iced beverage dispensing machine, the combination comprising an upstanding tube having an inner wall and an outer wall, said inner wall defining an upstanding cylindrical freezing chamber having an outlet at the upper end thereof, an inlet for supplying water to said freezing chamber, means for cooling said tube to freeze water in said freezing chamber, an upstanding auger in said freezing chamber for scraping ice from said inner wall and for delivering the ice to said outlet, an ice storage hopper mounted above said freezing chamber and in communication with said outlet, drive mechanism for operating said auger to force the ice from said chamber through said outlet and into said storage hopper for storage therein, and a cooling coil wrapped around and supported by and in direct thermal contact with the outer wall of said storage hopper whereby the ice in said storage hopper cools fluid flowing through said cooling coil.

12. The combination set forth in claim 11, and further comprising an extruding head positioned above and spaced from the upper end of said auger in alignment with said outlet and communicating with said storage hopper and having an ice compressing and ice shaping passage therethrough, said drive mechanism in operating said auger serving to force flaked ice from said outlet into and through said ice passage, and an ice blocking member for periodically substantially blocking the outlet of said ice passage to compress and to congeal the particles of flaked ice therein to form in said ice passage rods of compact and coherent ice that are further moved into said storage hopper for storage therein and for cooling fluid flowing through said conduit.

13. In an iced beverage dispensing machine, the combination comprising an upstanding tube having an inner wall and an outer wall, said inner wall defining an upstanding cylindrical freezing chamber having an outlet at the upper end thereof, an inlet for supplying water to said freezing chamber, means for cooling said tube to freeze water in said freezing chamber, an upstanding auger in said freezing chamber for scraping ice from said inner wall and for delivering the ice to said outlet, an ice storage hopper mounted above said freezing chamber and in communication with said outlet, drive mechanism for operating said auger to force the ice from said chamber through said outlet and into said storage hopper for storage therein, a first cooling conduit in thermal contact with the outer wall of said tube for cooling a first fluid flowing through said first conduit, and a second conduit in thermal contact with said storage hopper for cooling a second fluid flowing through said second conduit.

14. The combination set forth in claim 13, wherein said first cooling conduit is a coil wrapped around and supported by and in thermal contact with the outer wall of said tube, and said second conduit is a coil wrapped around and supported by and in thermal contact with the outer wall of said storage hopper.

15. The combination set forth in claim 13, wherein a plurality of said first cooling conduits is provided in the form of a corresponding plurality of coils wrapped around said tube and in thermal contact therewith for cooling a corresponding plurality of first fluids flowing through said first conduits.

16. The combination set forth in claim 13, wherein said means for cooling is a refrigerant coil disposed about said outer wall and in thermal contact therewith, and said first cooling conduit is disposed about and in thermal contact with said refrigerant coil for cooling said first fluid flowing through said first conduit.

17. The combination set forth in claim 13, and further comprising an extruding head positioned above and spaced from the upper end of said auger and having an ice compressing and ice shaping passage therethrough interconnecting said outlet and said storage hopper, and an ice blocking member for periodically substantially blocking the outlet of said ice passage to compress and to congeal particles of flaked ice therein to form in said ice passage rods of compact and coherent ice, said drive mechanism operating said auger to force flaked ice from said outlet into and through said ice passage to produce rods of compact and coherent ice that are delivered into said storage hopper for cooling said second conduit and the second fluid flowing therethrough.

18. In an iced beverage dispensing machine, the combination comprising an upstanding tube having an inner wall and an outer wall, said inner wall defining an upstanding cylindrical freezing chamber having an outlet at the upper end thereof, an inlet for supplying water to said freezing chamber, means for cooling said tube to freeze water in said freezing chamber, an upstanding auger in said freezing chamber for scraping ice from said inner wall and for delivering the ice to said outlet, drive mechanism for operating said auger to force the ice from said chamber and through said outlet, a fluid-tight vessel defining an upstanding corbonating chamber in thermal contact with said tube, a first inlet in said vessel for supplying water to said carbonating chamber and a second inlet in said vessel for supplying carbonating gas to said carbonating chamber, and an outlet in said vessel for delivering carbonated water from said carbonating chamber.

19. The combination set forth in claim 18, and further comprising a pair of brackets interconnecting said tube and said vessel to provide mechanical support therebetween and to provide good thermal contact therebetween.

20. The combination set forth in claim 18, wherein said means for cooling is a refrigerant coil disposed about the outer wall of said tube and in good thermal contact therewith for cooling both said tube and said vessel.

21. The combination set forth in claim 18, and further comprising a cooling conduit in good thermal contact with the outer wall of said tube for cooling flavor syrup flowing through said conduit.

22. An iced beverage dispensing machine comprising a housing having a dispensing station thereon to accommodate a container for an iced beverage, ice making apparatus in said housing and including an upstanding tube having an inner wall and an outer wall, said inner wall defining an upstanding cylindrical freezing chamber having a water inlet at the lower end thereof and an ice outlet at the upper end thereof, means for cooling said tube to freeze water in said freezing chamber, an upstanding auger in said freezing chamber for scraping ice from said inner wall and for delivering the ice to said ice outlet, an ice storage hopper mounted in said housing above said freezing chamber and in combination with said ice outlet and having a discharge opening communicating with said dispensing station, a door for said discharge opening movable between a normally closed position and an open dispensing position, drive mechanism for operating said auger to force the ice from said freezing chamber through said ice outlet and into said storage hopper for storage therein, a first cooling conduit in thermal contact with the outer wall of said tube and having an inlet adapted to be connected to a source of flavor syrup and an outlet at said dispensing station, a second conduit in thermal contact with said storage hopper and having an inlet connected to a source of water and an outlet at said dispensing station, and control mechanism for dispensing cold water from said second conduit and cold syrup from said first conduit to said dispensing station and for moving said door to the open position thereof to dispense ice cubes from said storage hopper to said dispensing station.

23. The iced beverage dispensing machine set forth in claim 22, wherein said cooling means for said tube is a refrigerant coil wrapped around and in thermal contact with said tube, said first cooling conduit is a first coil wrapped around said refrigerant coil and supported thereby and in thermal contact therewith, and said second conduit is a second coil wrapped around and supported by and in thermal contact with said storage hopper.

24. The iced beverage dispensing machine set forth in claim 22, and further comprising a water pump for supplying water under pressure through said second cooling conduit, a syrup pump for pumping syrup from a supply thereof through said first cooling conduit, and a common drive motor for said water pump and said syrup pump.

25. The iced beverage dispensing machine set forth in claim 24, wherein a plurality of said first cooling conduits is provided, and a corresponding plurality of syrup pumps is provided respectively for pumping a corresponding plurality of syrups through said first cooling conduits.

26. An iced beverage dispensing machine comprising a housing having a dispensing station thereon to accommodate a container for an iced bevergae, ice making apparatus in said housing and including an upstanding tube having an inner wall and an outer wall, said inner wall defiining an upstanding cylindrical freezing chamber having a water inlet at the lower end thereof and an ice outlet at the upper end thereof, means for cooling said tube to freeze water in said freezing chamber, an upstanding auger in said freezing chamber for scraping ice from said inner wall and for delivering the ice to said ice outlet, an ice storage hopper mounted in said housing above said freezing chamber and in communication with said ice outlet and having a discharge opening communicating with said dispensing station, a door for said discharge opening movable between a normally closed position and an open dispensing position, drive mechanism for operating said auger to force the ice from said freezing chamber through said ice outlet and into said storage hopper for storage therein, a first cooling conduit in thermal contact with the outer wall of said tube and having an inlet adapted to be connected to a source of flavor syrup and an outlet at said dispensing station, a second cooling conduit in thermal contact with said storage hopper and having an inlet connected to a source of water and an outlet, a carbonator including a fluid-tight vessel in thermal contact with said tube and defining an upstanding carbonating chamber, a cold water inlet in said vessel connected to the outlet of said second conduit for supplying cold water to said carbonating chamber, a gas inlet in said vessel for supplying carbonating gas to said carbonating chamber, an outlet in the lower end of said vessel for delivering carbonated water from said carbonating chamber to said dispensing station, and control mechanism for dispensing carbonated water from said carbonator and cold syrup from said first conduit to said dispensing station and for moving said door to the open dispensing position thereof to dispense ice from said storage hopper to said dispensing station.

27. The iced beverage dispensing machine set forth in claim 26, and further comprising a water pump having an inlet connected to a source of water and an outlet connected to the inlet of said second cooling conduit, a discharge conduit having one end connected to said vessel outlet and the other end normally closed by a dispensing valve, and a float actuated valve in said vessel outlet, said control mechanism causing operation of said water pump and opening of said dispensing valve, whereby to inject water into said carbonator to cause substantially instantaneous carbonation of the water and after collecting sufficient carbonated water in the lower end of said carbonator to open said float valve thus dispensing carbonated water through said discharge conduit and through said open dispensing valve.

28. An iced beverage dispensing machine comprising a housing having a dispensing station thereon to accommodate a container for an iced beverage, ice making apparatus in said housing and including an upstanding tube having an inner wall and an outer wall, said inner wall defining an upstanding cylindrical freezing chamber having a water inlet at the lower end thereof and an ice outlet at the upper end thereof, means for cooling said tube to freeze water in said freezing chamber, an upstanding auger in said freezing chamber for scraping ice from said inner wall and for delivering the ice to said ice outlet, an ice storage hopper mounted in said housing above said freezing chamber and in communication with said ice outlet and having a discharge opening communicating with said dispensing station, a door for said discharge opening movable between a normally closed position and an open dispensing position, drive mechanism for operating said auger to force the ice from said freezing chamber through said ice outlet and into said storage hopper for storage therein, a first cooling conduit in thermal contact with the outer wall of said tube and having an inlet adapted to be connected to a source of flavor syrup and an outlet at said dispensing station, a second cooling conduit in thermal contact with said storage hopper and having an inlet connected to a source of water and an outlet, a first discharge conduit having an opening connected to the outlet of said second cooling conduit and having the other end thereof at said dispensing station, a first dispensing valve disposed in said first discharge conduit, a carbonator including a fluid tight vessel in thermal contact with said tube and defining an upstanding carbonator chamber, a cold water inlet in said vessel connected to the outlet of said second conduit for supplying cold water to said carbonating chamber, a gas inlet in said vessel for supplying carbonating gas to said carbonating chamber, an outlet in the lower end of said vessel for delivering carbonated water from said carbonating chamber, a second discharge conduit having one end connected to said vessel outlet and the other end thereof at said dispensing station, a second dispensing valve disposed in said second discharge conduit, and control mechanism selectively operable to open said first dispensing valve to dispense still water and cold syrup to said dispensing station or to open said first dispensing valve and said door for dispensing still water and cold syrup and ice to said dispensing system or to open said second dispensing valve for dispensing carbonated water and cold syrup to said dispensing station or for opening said second dispensing valve and said door to dispense carbonated water and cold syrup and ice to said dispensing station.

29. The iced beverage dispensing machine set forth in claim 28, and further comprising a water pump for pumping a first predetermined quantity of water from an inlet thereto connected to a source of water and an outlet therefor connected to the inlet of said second cooling conduit, and a bypass valve having the inlet thereof connected to the inlet of said second cooling conduit and operable when open to cause a second predetermined quantity of the first predetermined quantity of water delivered by said water pump to be diverted from said second cooling conduit, said control mechanism serving to open said bypass valve when ice is to be dispensed at said dispensing station.

30. The iced beverage dispensing machine set forth in claim 28, and further comprising a stirrer in said storage hopper and operatively connected to said auger for stirring the ice stored in said storage hopper, said control mechanism causing operation of said stirrer each time that a drink is dispensed from said machine including drinks containing no ice and drinks containing ice and drinks containing still water and drinks containing carbonated water.

31. The iced beverage dispensing machine set forth in claim 28, wherein said control mechanism is manually operable.

32. The iced beverage dispensing machine set forth in claim 28, wherein said control mechanism is coin actuated.

33. In an iced beverage dispensing machine, the combination comprising an upstanding tube having an inner wall and an outer wall, said inner wall defining an upstanding cylindrical freezing chamber having an outlet at the upper end thereof, an inlet for supplying water to said freezing chamber, means for cooling said tube to freeze water in said freezing chamber, an upstanding auger in said freezing chamber for scraping ice from said inner wall and for delivering the ice to said outlet, an ice storage hopper mounted above said freezing chamber and in communication with said outlet, drive mechanism for operating said auger to force the ice from said chamber through said outlet and into said storage hopper for storage therein, a first cooling conduit in thermal contact with the outer wall of said tube for cooling water flowing through said first conduit, a second conduit in thermal contact with said storage hopper for cooling water flowing through said second conduit, a fluid-tight vessel defining an upstanding carbonating chamber in thermal contact with said tube, a first inlet in said vessel for supplying cooled water from said second conduit to said carbonating chamber and a second inlet in said vessel for supplying carbonating gas to said carbonating chamber, and an outlet in said vessel for delivering carbonated fluid from said carbonating chamber.

34. The combination set forth in claim 33, wherein said first cooling conduit is a coil wrapped around and supported by and in thermal contact with the outer wall of said tube, and said second conduit is a coil wrapped around and supported by and in thermal contact with the outer wall of said storage hopper.

35. The combination set forth in claim 33, wherein said means for cooling is a refrigerant coil disposed about said outer wall and in thermal contact therewith, and said first cooling conduit is disposed about and in thermal contact with said refrigerant coil for cooling said first fluid flowing through said first conduit.

36. In an iced beverage dispensing machine, the combination comprising a housing having a dispensing station thereon to accommodate a container for an iced beverage, ice making apparatus in said housing and including an upstanding tube having an inner wall and an outer wall, said inner wall defining an upstanding cylindrical freezing chamber having an outlet at the upper end thereof, an inlet for supplying water to said freezing chamber, means for cooling said tube to freeze water in said freezing chamber, an upstanding auger in said freezing chamber for scraping ice from said inner wall and for delivering the ice to said outlet, an ice storage hopper mounted above said freezing chamber and in communication with said outlet, drive mechanism for operating said auger to force the ice from said freezing chamber through said outlet and into said storage hopper for storage therein, a water pump having an inlet connected to a source of water and an outlet, a cooling coil wrapped around and supported by and in thermal contact with the outer wall of said storage hopper and having one end connected to said pump outlet to introduce water into said cooling coil whereby the ice in said storage hopper cools the water flowing through said cooling coil, a fluid-tight vessel defining an upstanding carbonating chamber in thermal contact with said tube, a first inlet in said vessel for supplying water to said carbonating chamber and a second inlet in said vessel for supplying carbonating gas to said carbonating chamber, an outlet in said vessel for delivering carbonated water from said carbonating chamber, said cooling coil having a first discharge conduit connected thereto for discharging cooled uncarbonated water at said dispensing station, a dispensing valve disposed in said first discharge conduit, a second conduit interconnecting said first discharge conduit and said first vessel inlet for passing cooled water from said cooling coil into said carbonating chamber, a second discharge conduit having one end connected to said vessel outlet and the other end thereof at said dispensing station, means for dispensing carbonated water from said vessel into said second discharge conduit, and control mechanism selectively operable to cause operation of said water pump and to open said dispensing valve to dispense uncarbonated water to said dispensing station or to dispense carbonated water from said carbonating chamber to said dispensing station.

37. The beverage dispensing machine set forth in claim 36, wherein said means for cooling is a refrigerant coil disposed about the outer wall of said tube and in good thermal contact therewith for cooling both said tube and said vessel.

38. The beverage dispensing machine set forth in claim 36, and further comprising a second cooling coil wrapped around and supported by and in thermal contact with the outer wall of said tube for cooling flavor syrup flowing through said second cooling coil, said second cooling coil having an inlet adapted to be connected to a source of flavor syrup and an outlet at said dispensing station, said control mechanism being selectively operable to dispense cold syrup at said dispensing station substantially simultaneously with the dispensing of said uncarbonated water or said carbonated water.

39. In an iced beverage dispensing machine, the combination comprising an upstanding tube having an inner wall and an outer wall, said inner wall defining an upstanding cylindrical freezing chamber having an outlet at the upper end thereof, an inlet for supplying water to said freezing chamber, a refrigerant coil disposed about said outer wall and in good thermal contact therewith for cooling said tube to a temperature low enough to freeze water in said freezing chamber thereby to provide ice therein, means for delivering the ice to said outlet, and a cooling conduit in thermal contact with said refrigerant coil for cooling flavor syrup flowing through said conduit.

References Cited
UNITED STATES PATENTS

| | | | |
|---|---|---|---|
| 2,035,391 | 3/1936 | Lear. | |
| 2,850,213 | 9/1958 | Cole | 222—146 |
| 3,196,625 | 7/1965 | Nicolaus | 62—71 |
| 3,196,624 | 7/1965 | Reynolds | 62—71 |
| 3,211,338 | 10/1965 | Weil et al. | 222—146 X |

ROBERT B. REEVES, *Primary Examiner.*

HADD S. LANE, *Examiner.*

UNITED STATES PATENT OFFICE
CERTIFICATE OF CORRECTION

Patent No. 3,378,170                                    April 16, 1968

Donald S. Reynolds et al.

It is hereby certified that error appears in the above numbered patent requiring correction and that the said Letters Patent should read as corrected below.

Column 5, line 43, "3,196,682" should read -- 3,196,628 --. Column 7, line 46, "the" should read -- by --. Column 12, line 21, "baar" should read -- bar --. Column 15, line 56, "dischages" should read -- discharges --; line 62, "point" should read -- pointed --. Column 17, line 57, "accesisble" should read -- accessible --. Column 19, line 5, "through" should read -- though --. Column 21, line 46, "corbonating" should read -- carbonating --. Column 22, line 3, "combination" should read -- communication --; line 44, "bevergae" should read -- beverage --.

Signed and sealed this 19th day of August 1969.

(SEAL)
Attest:

EDWARD M. FLETCHER, JR.                        WILLIAM E. SCHUYLER, JR.
Attesting Officer                                 Commissioner of Patents